US012804426B2

(12) United States Patent
Guo

(10) Patent No.: US 12,804,426 B2
(45) Date of Patent: Nov. 17, 2026

(54) SYSTEMS AND METHODS FOR PCI CONFUSION DETECTION

(71) Applicant: NetScout Systems, Inc., Westford, MA (US)

(72) Inventor: Bill Guo, Westford, MA (US)

(73) Assignee: NetScout Systems, Inc., Westford, MA (US)

( * ) Notice: Subject to any disclaimer, the term of this patent is extended or adjusted under 35 U.S.C. 154(b) by 213 days.

(21) Appl. No.: 18/976,223

(22) Filed: Dec. 10, 2024

(65) Prior Publication Data

US 2026/0164261 A1 Jun. 11, 2026

(51) Int. Cl.

*H04W 24/02* (2009.01)
*H04B 17/318* (2015.01)
*H04W 64/00* (2009.01)

(52) U.S. Cl.

CPC .......... *H04W 24/02* (2013.01); *H04B 17/318* (2015.01); *H04W 64/00* (2013.01)

(58) Field of Classification Search

CPC ..... H04W 24/02; H04W 64/00; H04B 17/318
See application file for complete search history.

(56) References Cited

U.S. PATENT DOCUMENTS

2016/0014651 A1* 1/2016 Wellington ..... H04W 36/00835 455/436
2018/0063757 A1* 3/2018 Gormley ............... H04W 88/08
2020/0187067 A1* 6/2020 Decarreau ............. H04W 24/10
2021/0250822 A1* 8/2021 Mishra .................. H04W 4/029
2023/0337075 A1* 10/2023 Zhang ................... H04W 36/08
2026/0214527 A1* 7/2026 Zhong ............. H04W 36/00835

* cited by examiner

*Primary Examiner* — Jungwon Chang
(74) *Attorney, Agent, or Firm* — Foley & Lardner LLP

(57) ABSTRACT

A method for detecting PCI confusion during cellular network handovers includes identifying a geographic location of a handover failure of a user device from a first cell to a second cell, determining a strength of a signal to be received by the user device from the second cell, identifying, based on the strength of the signal to be received by the user device from the second cell, a hidden neighbor cell of the first cell, determining a strength of a signal to be received by the user device from the hidden neighbor cell, classifying, based on the determined signal strength of the hidden neighbor cell, a cause of the confusion during cellular network handovers, modifying, based on the classified cause of confusion, one or more parameters of the second cell or the hidden neighbor cell to prevent confusion during future cellular network handovers.

20 Claims, 8 Drawing Sheets

601

SYSTEMS AND METHODS FOR PCI CONFUSION DETECTION

BACKGROUND

In some networks, neighboring cells can be identified by the same identifier. This may cause problems during handover events of user devices from one cell to another cell.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
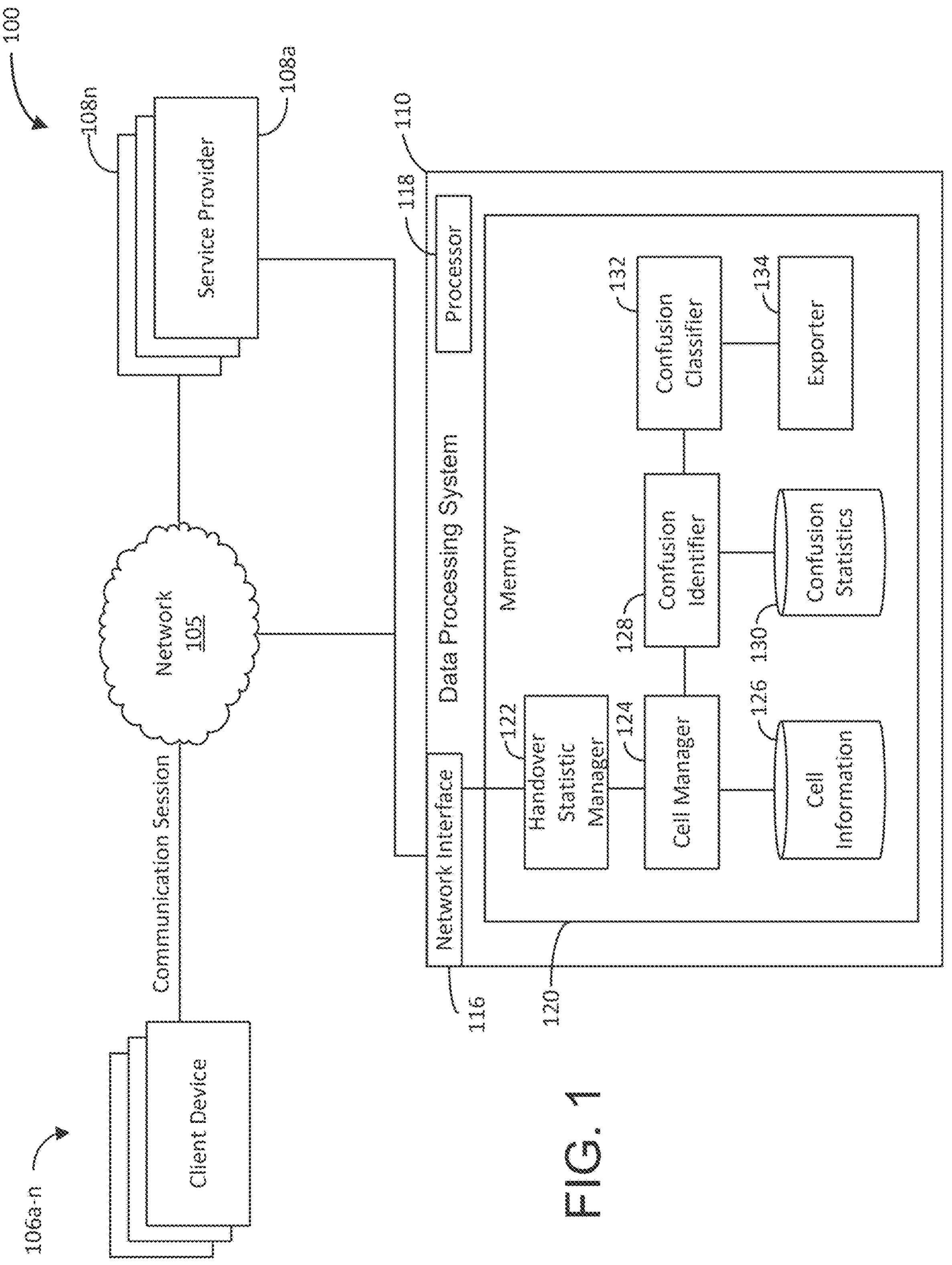
FIG. 1 is an illustration of a system for PCI confusion detection, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

A PCI (Physical Cell Identity) is an identifier of a cell (e.g., a geographical location) in a physical layer of a network (e.g., a 4G Long Term Evolution (LTE) network, a 5G New Radio (NR) network, etc.) which corresponds to a unique combination of primary synchronization signals (PSS) and secondary synchronization signals (SSS). User equipment (UE), such as a mobile phone, differentiates among different cells by reading PSS and SSS in the PCI to achieve time and frequency synchronization to a base station (e.g., an eNB in a 4G network or a gNB in a 5G network) associated with or corresponding to the cell. A number of unique PCIs available to different cells is limited due to a need of orthogonal neighboring PCIs. For example, in a 4G LTE network, the PCI range is from 0 to 503, providing a total of 504 unique PCIs. In a 5G NR network, the PCI range is from 0 to 1007, providing a total of 1008 unique PCIs.

Since the network may contain a larger number of cells than available unique PCIs, the same PCI may be reused by multiple cells. The cells may be or be required to be appropriately segregated in order to avoid confusion between cells, particularly during a handover event. For example, a first cell may be serving UE. The UE may move out of the geographic location served by the cell and may enter into a geographic area served by a neighboring cell, thereby causing a handover to occur so the signal from the UE is communicated with the neighboring cell (e.g., the neighboring cell becomes a new serving cell).

In 4G LTE and 5G NR radio access technologies, during mobility (e.g., a handover procedure) the UE continues to monitor radio conditions of neighboring cells and report radio measurements for each cell detected by the UE, identified by PCI and frequency of each cell. The cell serving the UE uses the PCI and frequency to map to the matching neighboring cell, and subsequently prepares and initiates a handover from the serving cell to the target cell. For a successful handover to occur, the PCI allocation in a neighborhood (e.g., in a region of neighboring cells) may fulfill a condition that each neighboring cell should have a unique PCI. When neighboring cells have the same PCI, there may be ambiguity in resolving reported PCI to the correct target cell. PCI confusion may exist between cells having the same frequency. The frequency may be defined by EARFCN (E-UTRA Absolute Radio Frequency Channel Number) in 4G networks and ARFCN (New Absolute Radio Frequency Channel Number) in 5G networks.

PCI confusion occurs when a first cell serving the UE neighbors two other cells having the same PCI. When the UE reports a radio measurement of an actual or intended target cell to initiate the handover (e.g., from the first serving cell to the intended target/receiving cell), the first serving cell may mistakenly identify the other neighboring cell as the intended cell. The serving cell may then initiate a handover preparation towards incorrect neighboring cell. The handover of UE to the incorrect neighboring cell may fail because the incorrect neighboring cell is not reachable by the UE. For example, as the UE moves through the geographic area covered by the intended cell, the UE may move further away from the incorrect neighboring cell such that the signal communicated to the cell weakens and eventually drops.

Currently, many automatic neighbor relation (ANR) tools may learn and discover neighbors of cells. However, the ANR tools may utilize an intrusive approach to detect PCI confusion. For example, some ANR tools may use a base station (e.g., an eNB) to perform an E-UTRAN Cell Global Identifier (ECGI) report procedure to request that the UE send a cell ID for the reported PCI. This process may introduce additional interactions between the network and the UE, which may result in network performance degradation and UE battery loss.

The systems and methods described herein provide a manner of detecting PCI confusion and preventing future confusions from occurring. The systems and methods provide a non-intrusive approach to detecting PCI confusion based on passive monitoring of the network. The system avoids interference or performance impacts on the UE and the network. The system may detect both basic and complex causes of PCI confusion. For example, the system can detect PCI confusion caused by PCI misallocation, as well as overshooting or reflection.

To do so, the system identifies that a handover failure of a user device has occurred between a first cell and a second cell. The system may determine statistics information relating to the handover failure, such as a location of the user device, a location of the handover. Based on the determined information, the system determines the second cell is a confusion candidate, meaning that a third cell may be located near the first and second cells and have a same PCI as the second cell, causing the handover from the first cell to the second cell to fail. The system may then determine a hidden neighbor cell of the first cell based on coverage areas of each of the cells. For example, the system may identify a specific third cell as the hidden neighbor cell. The system determines a geographic area or region that a cell serves or covers. The system may determine an overlap in the coverage areas of the first cell and the second cell and determine a strength of a signal of the second cell to be received by the user equipment. Based on the strength of the signal of the second cell, the system may determine a hidden neighbor cell of the first cell. For example, the system may query a table associated with the first cell that includes a list of multiple potential hidden neighbor cells (e.g., multiple cells that are located near the first cell). The table may also include a list of cells that have previously performed a successful handover with the serving cell. For each cell present in the table, an associated PCI of the cell may be included. Therefore, upon a handover failure between the first and second cells, the system may determine a hidden neighbor cell by identifying one or more additional cells (e.g., other than the second cell) that have the same PCI and/or frequency as the second cell. The system may query the table by, for example, performing a search of all cells in the table, performing a search for cells in the table having the same PCI as the second cell, etc.

Determining the first cell's hidden neighbor cell may indicate the confusion cell of the second cell, meaning that the hidden neighbor cell is the cell detected by user equipment (UE) as emitting a signal stronger than that of the second cell, but the handover was initiated with the second cell, causing the handover failure. Upon determining the overlapping coverage area and identifying the confusion cell of the second cell, the system determines a strength of a communication signal to be received by the user device from the second cell and the hidden neighbor cell. Based on the determined signal strength, the system classifies a type or cause of the confusion that occurred during the handover. Based on the type of confusion, the system can modify one or more parameters of the second cell or the hidden neighbor cell to prevent future confusion and handover failures. For example, the system can modify the hidden neighbor cell so the coverage area no long overlaps with the coverage area of the first cell, thereby preventing the first cell from initiating a handover with the second cell while receiving a UE report of the confusion neighbor cell.

FIG. 1 is an illustration of a system 100 for PCI confusion detection, in accordance with an implementation. The system 100 may enable detection of PCI confusion when handover failure occurs. In brief overview, the system 100 can include, access, or otherwise interface with one or more of a data processing system 110 (e.g., a probe, an inspection device), that receives and/or stores data packets transmitted via a network 105 between client devices 106*a-n* (hereinafter client device 106 or client devices 106) and service providers 108*a-n*. The service providers 108 can each include a set of one or more servers 602, depicted in FIG. 6A, or a data center 608. The client device 106 may be an example of a user equipment (UE) or another device that can access the network 105. The client device 106 can communicate with the service providers 108 to access a service (e.g., a website, an application, etc.). The client device 106, the service provider 108, and the data processing system 110 can communicate or interface with via the network 105 or directly.

Each of the client devices 106, the service providers 108, and/or the data processing system 110 can include or utilize at least one processing unit or other logic device such as programmable logic array engine, or module configured to communicate with one another or other resources or databases. The components of the client devices 106, the service providers 108, and/or the data processing system 110 can be separate components or a single component. In some embodiments, the data processing system 110 may be an intermediary device between the client devices 106 and the service providers 108. In some embodiments, the service provider 108, the data processing system 110, or any combination thereof, may share at least some components or be the same device. The system 100 and its components can include hardware elements, such as one or more processors, logic devices, or circuits.

The client devices 106, the service providers 108, and/or the data processing system 110 can include or execute on one or more processors or computing devices (e.g., the computing device 603 depicted in FIG. 6C) and/or communicate via the network 105. The network 105 can include computer networks such as the Internet, local, wide, metro, or other area networks, intranets, satellite networks, and other communication networks such as voice or data mobile telephone networks. Via the network 105, the client device 106 can access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, via the network 105, the client devices 106 can communicate with the servers of the service providers 108 for data (e.g., a communication session including requests from the client devices 106 and responses from the service providers 108).

The network 105 may be or include mobile telephone networks using any protocol or protocols used to communicate among mobile devices, including universal mobile telecommunications system ("UMTS"), 4G, long term evolution wireless broadband communication ("LTE"), 5G, etc. Different types of data may be transmitted via different protocols, or the same types of data may be transmitted via different protocols. In some embodiments, the network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

The service provider 108 can be hosted by a third-party cloud service provider via a virtual environment. The service provider 108 can be hosted in a public cloud, a co-location facility, or a private cloud. The service provider 108 can be hosted in a private data center, or on one or more physical servers, virtual machines, or containers of an entity or customer. The service providers 108 may each be or include servers or computers configured to transmit or provide services across network 105 to client devices 106. The service providers 108 may transmit or provide such services upon receiving requests for the services from any of the client devices 106. The term "service" as used herein includes the supplying or providing of information over a network and is also referred to as a communications network service. Examples of services include 5G broadband services, any voice, data or video service provided over a network, smart-grid network, digital telephone service, cellular service, Internet protocol television (IPTV), etc. The service may further include a SaaS application, such as a word processing application, spreadsheet application, presentation application, electronic message application, file storage system, productivity application, or any other SaaS application. The service provider 108 can be hosted or refer to cloud 610 depicted in FIG. 6B.

The client device 106 can establish communication sessions with the service providers 108 to receive data from the service providers 108. For example, a user associated with the client device 106 may request a service. Responsive to the request, a cloud provider 108 associated with the service may send requested data to the client device 106 in a communication session. In some cases, the request may be a bad request. For example, due to a handover failure caused by a handover being initiated between a serving cell and a confusion cell (e.g., an target cell that has the same PCI and frequency as another hidden neighbor cell of the serving cell), the request may not be transmitted or received. For example, a handover failure occurs when communication with the user device is attempted to be established with a confusion cell, and no communication session may exist between the user device and the confusion cell. This may be due to the confusion cell having the same PCI and frequency as the hidden neighbor cell but emitting a weaker signal relative to the signal emitted from the hidden neighbor cell. Therefore, until a connection is reestablished with a proper target cell, data requests to and from the client device 106 may not be received or transmitted. As such, issues occurring during handover failures may include data requests not being sent or received, calls not being initiated, calls being dropped, etc.

The client device 106 can be located or deployed at any geographic location in the network environment depicted in FIG. 1. The client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. The client device 106 can be deployed at a separate site, such as an availability zone managed by a public cloud provider (e.g., a cloud 610 depicted in FIG. 6B). If the client device 106 is deployed in a cloud 610, the client device 106 can include or be referred to as a virtual client device or virtual machine. In the event the client device 106 is deployed in a cloud 610, the packets exchanged between the client device 106 and the service providers 108 can still be retrieved by the data processing system 110 from the network 105. In some cases, the client devices 106 and/or the data processing system 110 can be deployed in the cloud 610 on the same computing host in an infrastructure 616 (described below with respect to FIG. 6B).

The data processing system 110 may comprise one or more processors that are configured to obtain network data packets from the service providers 108 during a communication session between the client device 106 and the service providers 108. The data processing system 110 may comprise a network interface 116, a processor 118, and/or memory 120. The data processing system 110 may communicate with any of the client devices 106 and/or the service providers 108 via the network interface 116. The processor 118 may be or include an ASIC, one or more FPGAs, a DSP, circuits containing one or more processing components, circuitry for supporting a microprocessor, a group of processing components, or other suitable electronic processing components. In some embodiments, the processor 118 may execute computer code or modules (e.g., executable code, object code, source code, script code, machine code, etc.) stored in the memory 120 to facilitate the operations described herein. The memory 120 may be any volatile or non-volatile computer-readable storage medium capable of storing data or computer code.

The memory 120 may include one or more of a handover statistic manager 122, a cell manager 124, a cell information database 126, a confusion identifier 128, a confusions statistics database 130, a confusion classifier 132, and an exporter 134. The data processing system 110 may further include other components, managers, handlers, etc. to perform the techniques as described herein. In brief overview, the components 122-134 may obtain a network data packet associated with a communication session between the client device 106 and a network service provider (e.g., the service providers 108). The components 122-134 may identify a geographic location of a handover failure of a client device 106 from a first cell to a second cell and collect handover statistics. The components 122-134 may identify the second cell as a PCI confusion candidate based on a statistics pattern of repeated handover failure between the first and second cells. The components 122-134 may determine a strength of each signal received by the user device from the second cell, based on that the signal strength, determine the second cell as a PCI confusion candidate cell. The components 122-134 may identify a hidden neighbor cell of the first cell, based on the identified geographic locations and/or the coverage area of the first cell. The components 122-134 may determine a strength of the signal received by the user device from the hidden neighbor cell. The components 122-134 may classify a cause of confusion during the handover procedure and/or may modify one or more parameters of the hidden neighbor cell or the second cell to prevent confusion during future handovers based on the classified cause of the confusion.

The handover statistic manager 122 may comprise programmable instructions that, upon execution, cause the processor 118 to collect or determine statistics of a handover between a first (e.g., a serving) cell and a second (e.g., receiving) cell. In some implementations, the service provider 108 may initiate, trigger, identify, and/or execute a handover, and statistics associated with the handover may be transmitted to or communicated to the handover statistic manager 122. As stated above, a handover may occur when a signal or communication between a UE (e.g., the client device 106) and a first cell is transferred so the communication now occurs between the UE and a second, neighboring cell.

For example, the client device 106 (e.g., the UE, a client cellphone, etc.) may move within a cell and/or from a geographic area covered by a first cell to a geographic area covered by a second cell. In a situation in which the client device 106 moves from an area covered by a first cell to an area covered by a second cell, a handover may occur. As such, the handover statistic manager 122 may attempt to find or determine the best or optimal cell to handoff the signal to. For example, the client device 106 may be in an area served by a cell (referred to as a serving cell), and, upon leaving the serving cell coverage area, may have the option to enter into one or more neighboring cells that may be an intended target to receive the signal during the handover procedure.

In some embodiments, multiple cell may be located near the serving cell that have the same PCI and same frequency. The client device 106 may detect a strong signal from one of the cells and report an indication of the signal to the current serving cell. In some embodiments, the reported signal may be associated with a cell that is an unintended target but the serving cell may misunderstand it as an intended target. That is, if a handover occurs between the serving cell and the intended target cell, the handover may fail (e.g., a call on the client device 106 may be dropped, etc.). As stated, this may be due to two or more cells neighboring the serving cell having the same PCI and/or signal frequency, leading to confusion for the serving cell.

For example, the client device 106 may be moving from a range or coverage area associated with the serving cell to another cell. The serving cell may be associated with one or more receiving or target cells that are known to receive handovers from the serving cell. However, the client device 106 may detect and report a best or optimal target cell not associated with the serving cell but having the same PCI as an associated cell to the serving cell. For example, the client device 106 may indicate that a strong signal is detected from a certain cell neighboring the current serving cell that has the same PCI as another neighboring cell that has previously been indicated as successfully accepting handovers from the serving cell. As the client device 106 moves further from the coverage area of the serving cell and nearer a coverage area of the neighboring cell, the signal from the serving cell may diminish and the signal from the neighboring cell may improve, causing the network 105 to determine that a handover of the signal should occur so that communication switches from between the client device 106 and the serving cell to between the client device 106 and the neighboring cell.

In some embodiments, a neighboring cell 214 (shown in FIG. 2) having the stronger signal may not be an intended target cell 212. For example, the neighboring cell 214 may have the same PCI and frequency as another neighboring cell that is and intended target cell 212 for handover. For example, as will be described with respect to FIG. 2, the strong signal from the neighboring cell 214 may be artificially high (e.g., due to PCI misallocation, signal overshooting or signal reflection), detected by the client device 106 and reported to serving cell of the network 105, the serving cell 210 may misunderstand the reported neighboring cell 214 as the intended target cell 212. When the network 105 attempt to handover the signal from the serving cell 210 to the intended target cell 212, the handover may fail (e.g., because the coverage area of the incorrect neighboring cell 212 does not reach a location of the client device 106).

For example, the neighboring cell that is the better option may have associated information (e.g., PCI) stored on a list of cells that have been previously successful in handovers with the serving cell. Because the incorrect or hidden neighbor cell has the same PCI as the neighbor or target cell stored on the serving cell's list and has a stronger signal than the neighbor or target cell stored on the serving cell's list, the handover may occur so the UE is served by the incorrect neighbor cell. The handover may fail because the signal from the incorrect neighboring cell is artificially high, and the neighboring cell does not actually have the capability to communicate with the client device 106. For example, the incorrect neighbor cell may be located away from the client device 106 such that as the client device 106 moves, the client device 106 moves from an area of the serving cell to an area of the intended/better target cell that is out of range of the incorrect/confusion cell, causing the handover to fail and/or the communication with the client device 106 to drop. The handover statistic manager 122 may communicate an indication of a handover failure to one or more components of the data processing system 110.

The cell manager 124 may comprise programmable instructions that, upon execution, cause the processor 118 to determine and/or manage information about each cell in the network. The information determined and/or managed by the cell manager 124 may be used to identify a cell causing the PCI confusion. For example, the information determined by the cell manager 124 may be used to identify a cell with which a handover was initiated that caused the handover to fail (e.g., an incorrect receiving or target cell).

As will be described with respect to FIG. 2, a typical network pattern of PCI confusion may occur when a client device 106 in a PCI confusion zone (e.g., in a region where hidden neighbor cell may have the same PCI and frequency as the planned neighbor cell) reports a neighbor cell with a strong signal to its serving cell. The reported neighbor cell may be identified by PCI. The serving cell may mistakenly map the reported neighbor cell to the planned neighbor cell by PCI and initiate handover signal or communication with the client device 106 to the planned neighbor. The handover statistic manager 122 may collect statistics relating to a handover procedure with the planned cell, which may fail.

During a handover, the cell manager 124 may manage information about the handover and the cells involved in the handover. For example, a handover procedure may be initiated from a serving cell to an intended target cell. The handover to the intended target cell may fail (e.g., because a hidden neighbor cell transmits a stronger signal to the client device 106 than the intended target cell emits). The cell manager 124 may manage information such as: a timestamp of the handover (e.g., a time at which the handover was initiated), an identifier of the serving cell, an identifier of the neighbor or receiving cell (e.g., the target cell), a PCI of the serving cell, and/or a PCI of the receiving cell. The cell manager 124 may also determine or receive information relating to the client device 106. For example, the cell manager 124 may receive information including: a client device identifier (e.g., an international mobile subscriber identity (IMSI), an international mobile equipment identity (IMEI), etc.), client device geolocation data (e.g., latitudes, longitudes, coordinates, a current location, etc.). The cell manager 124 may also receive handover preparation statistics and/or handover execution statistics. Handover preparation and execution statistics may include, for example, handover success rates, handover failure rates, an average handover delay time, signal strengths, etc.

The cell manager 124 may store the determined or received cell information in the cell information database 126. In some embodiments, the cell manager 124 retrieves data from the cell information database 126. For example, upon initiation of a handover, the cell manager 124 may receive the information from the serving and receiving cells and may store the information in the database 126.

The confusion identifier 128 may comprise programmable instructions that, upon execution, cause the processor 118 to identify one or more candidate cells that may be causing confusion and subsequently determine or confirm which cell is causing the confusion. For example, a single instance of a handover failure may not indicate to the data processing system 110 that PCI confusion is occurring.

However, repeated occurrences of handover failures with the same serving and neighboring or target cells may indicate that PCI confusion is occurring, and the confusion identifier 128 may identify such repeated confusion and a cell causing the confusion. An identified pattern of handover execution failures and/or a determination of a strength of a signal to be received by the client device 106 from the second, intended cell may indicate that the intended target cell is a PCI confusion candidate (e.g., a hidden neighbor cell exists causing handover execution to fail).

Based on information stored in the confusions statistics database 130, the confusion identifier 128 may calculate a coverage area of a cell (e.g., a coverage area of each cell determined to be a confusion candidate). Responsive to a determination by the confusion identifier 128 that a coverage area between two cells overlaps, the confusion identifier 128 determines or confirms that the two cells are neighboring cells. Therefore, cells causing confusion for a particular serving cell can be determined. For example, a serving cell may have an associated list of neighboring or receiving cells that successfully accept handovers from the serving cell. The confusion identifier 128 may use information associated with each of the neighboring cells on the list, information stored in the confusion statistics database 130 (e.g., information for each of the confusion candidate cells), and the determined cell coverage areas to determine confusion-causing neighbor cells. As will be described, an amplification factor may be applied to the cell coverage area calculation in order to avoid omitting potential neighbors (e.g., due to overshooting or reflection).

The confusion identifier 128 may receive, from the cell manager 124, cell information 126. The confusion identifier 128 may analyze the cell information 126. The confusion identifier 128 may determine that the cell information 126 indicates that there exists a high ratio of handover preparation success to handover execution success (e.g., handover preparation is successful but there are more handover execution failures than handover execution successes) between a serving and neighbor or target cell pair (i.e., a first cell and a second cell). The confusion identifier 128 may determine whether or not the neighbor cell (i.e., the second cell) is a confusion candidate by determining a signal strength received by the client device 106 from the second (e.g., neighbor) cell. The second cell being identified as a confusion candidate may indicate that a third, hidden neighbor cell exists that is causing handover execution to fail.

In various embodiments, handover preparation may succeed, but subsequent handover execution may fail. This may indicate PCI confusion, particularly if handover preparation succeed and execution fails on multiple occasions. Based on the statistics managed by the cell manager 124, the cell manager 124 and/or the confusion identifier 128 may calculate statistics for given time periods. For example, the confusion identifier 128 may calculate statistics for a serving and neighbor cell pair daily, weekly, etc. The confusion identifier 128 may analyze the managed statistics and identify patterns in the data. For example, the confusion identifier 128 may determine a pattern that a particular serving cell and neighbor/target cell pair have experienced a handover execution failure a particular number of times. The confusion identifier 128 may determine a number of instances of various events (e.g., a number of handover failures between different pairs of serving and neighboring cells). Further, the confusion identifier 128 may determine that the number of instances of one or more events for a particular serving cell, neighboring cell, serving cell and neighboring cell pair, etc. is at or above a predefined threshold value. Responsive to a determination that the number of instances is at or above the predefined threshold value, the confusion identifier 128 may identify a particular cell (e.g., the second, intended target cell) as being a confusion candidate (e.g., a hidden neighbor cell exists causing handover execution failure). The confusion identifier 128 may also identify a particular cell (e.g., a hidden neighbor cell) as being a candidate for causing PCI confusion.

The confusion identifier 128 may, upon determining one or more confusion candidate cells, identify a specific cell causing confusion (e.g., a hidden neighbor cell of a specific serving cell). The confusion identifier 128 may determine, receive, collect, etc. data related to all deployed cells in the network. The data may include, for example, for each cell, a cell identifier, a PCI, a signal frequency, geolocation information (e.g., latitude and longitude), a cell antenna azimuth (e.g., a horizontal angle of the antenna), a cell antenna down tilt (e.g., a vertical angle of the antenna), a horizontal beam width, a vertical beam width, a pilot power, an antenna gain, a transmission loss, etc. The data may be stored in the confusion statistics database 130.

The confusion identifier 128 may also determine or receive coverage areas of the first (e.g., serving) cell and the second (e.g., intended target) cell. Further, the confusion identifier 128 may determine one or more overlapping coverage areas between the first cell and the second cell based on the determined coverage areas of each cell. The confusion identifier 128 may then determine a strength of a signal to be received by the client device 106 from the second cell.

The confusion identifier 128 may calculate the signal power of the second cell (e.g., the target/intended cell) to the client device 106 according to the following formula, shown as Equation 1:

$$P(\text{dBm}) = \text{Power}+\text{Gain}-\text{Loss} - 1.2\left(\frac{\theta^2}{HBW^2}\right) - 1.2\left(\frac{\phi^2}{VBW^2}\right) \quad \text{(Eqn. 1)}$$

where power represents the power of the signal emitted by the second cell, gain represents a gain of the signal. loss represents a loss of the signal, θ represents an angular distance between the azimuth of the cell and the bearing vector between the point under consideration (e.g., the geolocation of the client device 106) and the cell under consideration (e.g., the second cell), the term $$1.2\left(\frac{\theta^2}{HBW^2}\right)$$

represents the horizontal angular loss of the signal, Φ is the angular distance between the vertical downtilt of the second cell and the bearing vector between the point under consideration (e.g., the geolocation of the client device 106) and the cell under consideration (e.g., the second cell), and the term $$1.2\left(\frac{\phi^2}{VBW^2}\right)$$

represents the vertical angular loss of the signal.

The confusion identifier 128 may retrieve or determine each of the values appropriate corresponding to the power, gain, loss, horizontal beam width ("HBW"), and vertical beam width ("VBW") variables for the second cell from the cell information database 126 and/or the confusion statistics database 130. For example, for each intended target cell for a serving cell, the cell information database 126 may have data corresponding to the second cell that can be retrieved by the confusion identifier 128.

In various embodiments, the formula used to calculate the signal power may vary. For example, one or more coefficients of variation may differ than those shown in Equation 1. For example, in some embodiments, the coefficients of variation may be 1.8 instead of 1.2 as shown.

Responsive to a determination that the signal strength from the second cell is below a threshold value and/or that a pattern of PCI confusion exists, the confusion identifier 128 may determine or check whether the serving cell (i.e., the first cell) has an associated hidden neighbor cell having the same PCI and frequency as the second cell. For example, the confusion identifier 128 may retrieve a list of potential hidden neighbor cells associated with the first/serving cell. The list may include a plurality of cells located proximate the serving cell, cells that have previously had a handover successfully initiated with the serving cell, etc. For example, based on the cell information 126 maintained by the cell manager 124, the confusion identifier 128 may determine whether the coverage area of the first cell overlaps with a hidden neighbor cell (e.g., another cell different than the second cell that exists on the list of potential hidden neighbor cells). Responsive to a determination that the coverage areas do overlap, the confusion identifier 128 may determine that the serving cell has an associated hidden neighbor cell. As will be described in greater detail herein, the confusion classifier 132 may classify a type of PCI confusion based on a signal strength received by the client device 106 from the identified hidden neighbor cell.

The confusion classifier 132 may comprise programmable instructions that, upon execution, cause the processor 118 to classify or determine a reason for the confusion. For example, the confusion classifier 132 may determine why the cell determined to cause the confusion (e.g., the hidden neighbor cell) was emitting a signal strong enough to be confused with the intended target cell.

Responsive to determination of the hidden confusion neighbor cell by the confusion identifier 128, the confusion classifier 132 may determine the reason for PCI confusion. For example, the confusion classifier 132 may use a geolocation of the client device 106 (e.g., by retrieving or receiving the geolocation data from the cell information database 126) to determine a reason for PCI confusion.

Specifically, the confusion classifier 132 may determine or calculate a signal power received by the client device 106 at the determined geolocation of the client device 106 from the hidden confusion neighbor cell. The confusion classifier 132 may perform the calculation based on or using information relating to the hidden confusion neighbor cell stored in the confusion statistics database 130. The confusion classifier 132 may calculate the hidden confusion neighbor cells' signal power to the client device 106 according to the following formula, shown as Equation 1:

$$P(\text{dBm}) = \text{Power} + \text{Gain} - \text{Loss} - 1.2\left(\frac{\theta^2}{HBW^2}\right) - 1.2\left(\frac{\phi^2}{VBW^2}\right) \quad \text{(Eqn. 1)}$$

where power represents the power of the signal emitted by the hidden confusion neighbor cell, gain represents a gain of the signal. loss represents a loss of the signal, θ represents an angular distance between the azimuth of the cell and the bearing vector between the point under consideration (e.g., the geolocation of the client device 106) and the cell under consideration (e.g., the hidden confusion neighbor cell), the term $$1.2\left(\frac{\theta^2}{HBW^2}\right)$$

represents the horizontal angular loss of the signal, Φ is the angular distance between the vertical downtilt of the hidden confusion neighbor cell and the bearing vector between the point under consideration (e.g., the geolocation of the client device 106) and the cell under consideration (e.g., the hidden confusion neighbor cell), and the term $$1.2\left(\frac{\phi^2}{VBW^2}\right)$$

represents the vertical angular loss of the signal.

The confusion classifier 132 may retrieve or determine each of the values appropriate corresponding to the power, gain, loss, horizontal beam width ("HBW"), and vertical beam width ("VBW") variables for the specific hidden confusion neighbor cell from the confusion statistics database 130. For example, for each potential confusion neighbor cell for a serving cell, the confusion statistics database 130 may have data corresponding to the potential confusion neighbor cell that can be retrieved by the confusion classifier 132.

In various embodiments, the formula used to calculate the signal power may vary. For example, one or more coefficients of variation may differ than those shown in Equation 1. For example, in some embodiments, the coefficients of variation may be 1.8 instead of 1.2 as shown.

In various implementations, the power received by the client device 106 may be calculated for each hidden confusion neighbor cell. In some embodiments, the data stored in the confusion statistics database 130 may be sampled and used in the calculation performed by the confusion classifier 132. After calculating received power for all determined geolocations of the client device 106, the confusion classifier 132 may determine an average and median of the received power levels (e.g., signal strengths). The confusion classifier 132 may compare the average and median received power levels against an appropriate threshold value (e.g., −100 dBm).

Responsive to a determination by the confusion classifier 132 that the received power level is equal to or greater than the threshold value, the confusion classifier 132 may determine that the geolocation of the client device 106 is within the coverage area of the hidden confusion neighbor cell. The confusion classifier 132 may indicate that the hidden confusion neighbor cell and the candidate neighbor cell (e.g., the intended target cell) have experienced PCI confusion due to PCI misallocation (e.g., a type of PCI confusion that will be described in greater detail with respect to FIG. 2).

Responsive to a determination by the confusion classifier 132 that the received power level is less than the threshold value, the confusion classifier 132 may determine whether multiple client devices 106 are located in a direction of the hidden neighbor cell's boresight (e.g., a direction of the axis of maximum gain of the hidden neighbor cell). Responsive to a determination by the confusion classifier 132 that multiple client devices 106 are located as such, the confusion classifier 132 may indicate or determine that the hidden neighbor cell and the candidate neighbor cell (e.g., the intended target cell) have experienced PCI confusion due to overshooting (e.g., a type of PCI confusion that will be described in greater detail with respect to FIG. 2).

Figure 2:
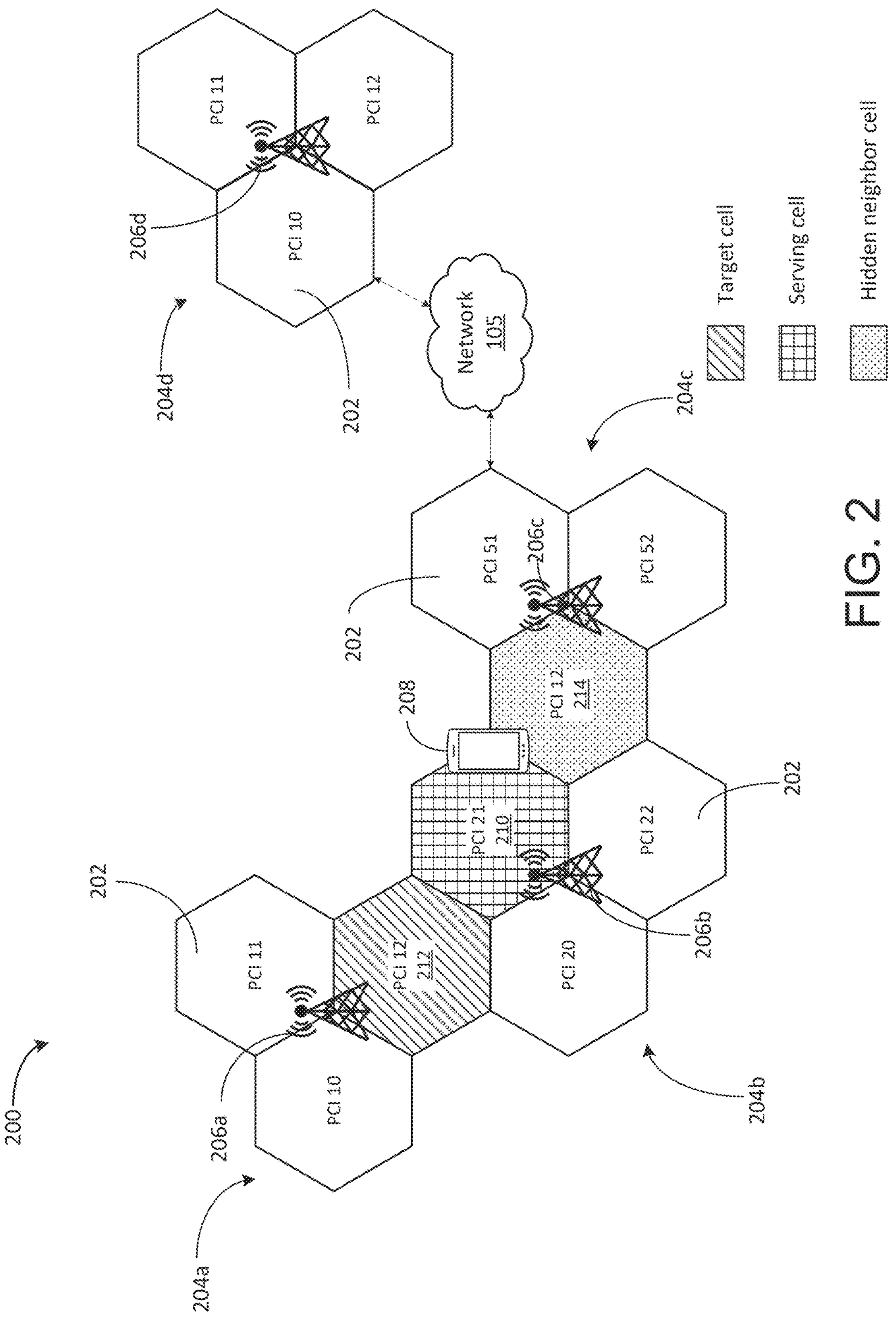
FIG. 2 is an illustration of a network showing PCI confusion, in accordance with an implementation.

Responsive to a determination by the confusion classifier 132 that the received power level is less than the threshold value and multiple client devices 106 are not located in a direction of the hidden neighbor cell's boresight, the confusion classifier 132 may determine or indicate that the hidden neighbor cell and the candidate neighbor cell (e.g., the intended target cell) have experienced PCI confusion due to PCI reflection (e.g., a type of PCI confusion that will be described in greater detail with respect to FIG. 2).

The exporter 134 may comprise executable instructions that, upon execution by the processor 118, may adjust operation of one or more cells responsive to the determination by the confusion classifier 132 that PCI confusion is occurring. The exporter 134 may adjust operation of the cell(s) differently depending on a type of determined PCI confusion.

The exporter 134 may receive or determine an actual signal of the hidden neighbor cell and/or the intended target cell. For example, in some embodiments, a technician may be deployed to a site of the cell and measure the actual signal power of the confusion cell and the measured signal may be reported to the exporter 134. In some embodiments, the exporter 134 may otherwise receive or determine the actual signal power. Based on a determination by the exporter 134 that the actual, measured signal power of the confusion neighbor cell is greater than a planned or expected power level, the exporter 134 may adjust operation of the cell to reduce the signal power. This may avoid or prevent an overshot signal from the confusion neighbor cell that introduced interference with the intended target neighboring tower (e.g., causing PCI confusion). Adjusting operation of the confusion neighbor cell may eliminate a situation in which the client device is geolocated in an overlapping coverage area of the intended target cell and confusion neighbor cell. For example, adjusting operation of the confusion neighbor cell may cause the coverage area of the confusion neighbor cell to be reduced or modified such that overlap no longer occurs and confusion between the intended target cell and the confusion neighbor cell cannot occur. In various embodiments, the exporter 134 may adjust operation of the intended target cell and/or the hidden neighbor cell to prevent future PCI confusion between the two cells.

The exporter 134 may adjust operation of the confusion neighbor cell and/or the intended target cell (e.g., modify one or more parameters of the cell(s)) by, for example, changing a tilt of an antenna of the cell, changing the power or strength of the signal emitted by the cell, changing a horizonal or vertical beam width of the cell, an angle of the cell, etc. For example, the exporter 134 may adjust an angle of the antenna of the cell to prevent or avoid a signal error or coverage area overlap.

FIG. 2 is an illustration of a network 200 showing PCI confusion. As shown, the network 200 includes a plurality of cells 202. Multiple cells may be grouped into cell groups 204*a-d*. Each cell group may be associated with a base station 206. For example, cell group 204*a* may be associated with the base station 206*a*, cell group 204*b* may be associated with the base station 206*b*, cell group 204*c* may be associated with the base station 206*c*, cell group 204*d* may be associated with the base station 206*d*.

As described above, due to a limited number of available unique PCIs, PCIs may be reused by many cells 202 in the network 200. Repeating PCIs may be appropriately assigned to differentiate and distinguish between neighboring cells throughout the entire network 202. Neighboring cells may be two or more cells sharing at least one boundary line or border, associated with the same base station 206, within a threshold distance of each other, etc. PCI allocation may be error prone, particularly in situations in which the network 200 changes (e.g., cell configurations change, etc.). Adjusting PCIs and other attributes of cells 202 in the network 200 to achieve network optimization may be routine (e.g., regular operations) and may be performed by the data processing system 110 and/or a network technician. However, multiple neighboring cells may cause the same PCI to be allocated to two or more neighboring cells. In some embodiments, multiple cells that do not neighbor each other but neighbor the same cell may be assigned the same PCI, which can cause confusion.

As shown in FIG. 2, the network 200 includes a client device 208 positioned near a first cell 210 and a second cell 212. The first cell 210 may be the serving cell of the client device 208 and may have a PCI of 21. In some embodiments, the PCI may be a number, a string of characters, etc. The second cell 212 may be the intended target cell of the serving cell 210 and may have a PCI of 12. That is, the client device 208 may be moving from an area served by the cell 210 (and, in some embodiments, the base station 206*b*) into an area served by the intended target cell 212 (and, in some embodiments, the base station 206*a*). As such, a handover may occur such that the client device may switch from sending and receiving a signal to and from the serving cell 210 to sending and receiving a signal to and from the target cell 212. The target cell 212 may be included on a list of target cells of the serving cell 210 that have previously successfully initiated and executed a handover of the signal communicated with client device 106.

However, a third cell 214 may be a hidden neighbor cell of the serving cell 210 and may also have a PCI of 12. As a result, confusion may occur between the target cell 212 and the hidden neighbor cell 214. For example, the client device 208 may be moving from an area served by the cell 210 (and the base station 206*b*) into an area served by the confusion target cell 214 (and the base station 206*c*). The hidden neighbor cell 214 may be emitting a signal strong enough that the serving cell 210 may treat the reported hidden neighbor target cell 214 as intended target cell 212 due to the cells 212 and 214 having the same PCI. The cell 210 may therefore initiate a handover procedure with the intended target cell 212, leading to a handover failure, because the hidden neighbor cell 214 is emitting a stronger signal than the cell 212.

As described above, there may be various reasons or causes of PCI confusion. Specifically, there may be various reasons that the hidden neighbor cell 214 confuses the serving cell 210 as the intended target cell 212.

One cause of PCI confusion may be PCI misallocation. For example, in some embodiments, both cell 212 and cell 214 may be intended target cells of the serving cell 210 but should have different PCI assigned to each (e.g., both cell 212 and cell 214 are listed on the list of target cells associated with the serving cell). The same PCI (e.g., 12) may be misallocated to both cell 212 and cell 214. This misallocation of the same PCI to both cells may cause PCI confusion. PCI confusion may cause a poor or reduced handover success rate, and may further cause radio resource control (RRC) connection or radio access bearer (RAB) drops if the client device 106 fails to return to the previous serving cell (e.g., serving cell 210) or select another cell with which to establish an RRC connection.

Another cause of PCI confusion may be signal overshooting. In some embodiments, cell 212 may be the intended target cell of the serving cell 210, and there may be an overlap between the coverage area of the serving cell 210 and the intended target cell 212. However, the signal emitted from the hidden neighbor cell 214 may be greater than expected (e.g., the signal from cell 214 is overshot), causing an overlap between the serving cell 210 and the cell 214. This may generate a PCI confusion zone between the serving cell 210 and the cell 214. As such, the client device 208 located in the PCI confusion zone may trigger the serving cell 210 to initiate a handover with the intended target cell 212, and handover may fail because the cell 212 is not reachable by the client device 208 (e.g., because the signal emitted from the cell 214 is greater than the signal emitted from the cell 212).

Another cause of PCI confusion may be signal reflection. In some embodiments, the coverage area of the serving cell 210 may overlap with the coverage area of the target cell 212, and the coverage area of the cell 214 may ordinarily not overlap with the coverage area of the serving cell 210. However, due to reflection of the signal of the cell 214, there may be overlap in the coverage areas of the serving cell 210 and the cell 214, generating a PCI confusion zone. Reflection of the signal of cell 214 may be caused, for example, by a building located near the cells 210 and 214. As such, the serving cell 210 may initiate a handover with the intended target cell 212, and handover may fail because the cell 212 is not reachable by the client device 208 (e.g., because the signal emitted from the cell 214 is greater than the signal emitted from the cell 212).

Figure 3:
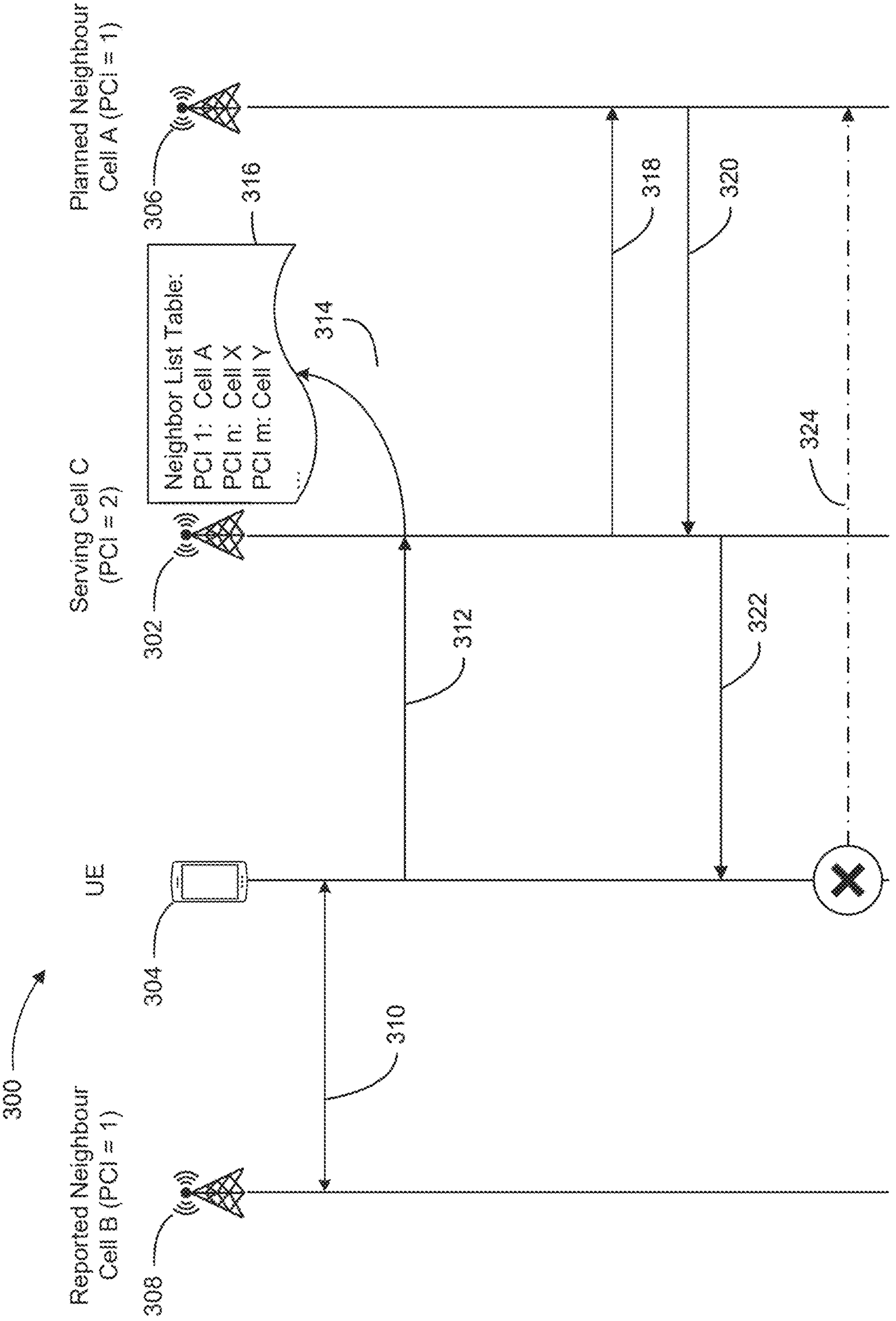
FIG. 3 is an illustration of a flow diagram of a process for a handover procedure with PCI confusion, in accordance with an implementation.

FIG. 3 is an illustration of a flow diagram of a process 300 indicating how PCI confusion occurs, in accordance with an implementation. The process 300 can be performed by a data processing system (the data processing system 110, shown and described with reference to FIG. 1). The process 300 may include more or fewer operations and the operations may be performed in any order. Performance of the process 300 may enable the data processing system to detect PCI confusion between cells. The method 300 may include communications performed between various components. For example, a serving cell 302 may be in communication with a client device 304. The client device 304 may exit a coverage area of the serving cell 302 and may intend to initiate a handover to a planned neighbor target cell 306. However, a neighbor cell 308 may have the same PCI as the planned neighbor cell 306, causing PCI confusion.

At operation 310, the client device 304 detects a signal from the reported neighbor cell 308. The reported neighbor cell 308 may be a hidden neighbor cell of the serving cell 302. The client device 304 may detect a strong signal from the reported neighbor cell 308 (e.g., a signal stronger than that emitted from the planned neighbor cell 306) when the client device 304 is located at an interaction or area of overlapping coverage between the reported neighbor cell 308 and the serving cell 302. The detected signal may be strong enough (e.g., at or above a threshold value, etc.) that the client device 106 reports the reported neighbor cell 308 to the serving cell 302. At operation 312, the client device 304 reports the detected signal and information corresponding to the reported neighbor cell 308 to the serving cell 302. For example, the client device 304 may transmit the PCI and frequency of the reported neighbor cell 308 to the serving cell 302. The PCI and frequency of the reported neighbor cell 308 may be the same as the PCI and frequency of the planned neighbor cell 306.

As a result, the serving cell 302 may misunderstand the reported neighbor cell 308 as the planned neighbor cell 306. For example, at operation 314, the serving cell 302 may query or access a neighbor list 316 associated with the serving cell 302. The neighbor list may include information corresponding to each neighboring cell that can successfully execute a handover from the serving cell 302. The serving cell 302 may access information corresponding to a neighboring cell based on PCI. As such, because the cell 306 and the cell 308 have the same PCI and frequency, the serving cell 302 may retrieve information corresponding to the planned neighbor cell 306 when the reported neighbor cell 308 is the cell reported to have a strong signal.

At operation 318, the serving cell 302 indicates that a handover procedure is to occur between the client device 304 and the planned neighbor cell 306. For example, the serving cell 302 may establish a resource on the planned neighbor cell 306 to prepare to hand over the communication with the user device 304 from the serving cell 302 to the planned neighbor cell 306. The handover preparation statistics may indicate that the handover preparation was successful. At operation 320, the planned neighbor cell 306 indicates to the serving cell 302 that the cell 306 is prepared to accept the handover.

At operation 322, the serving cell 302 indicates to the client device 304 that the planned neighbor cell 306 is prepared to accept the handover. However, when the client device 304 begins to execute the handover to planned neighbor cell 306 (e.g., the client device 304 switches from communicating with the serving cell 302 to the planned neighbor cell 306) during a handover execution phase, the handover may fail. Handover execution may fail because the client device 304 is located away from and outside of the coverage area of the planned neighbor cell 306, the client device 304 cannot establish a connection with the planned neighbor cell 306. At operation 324, the client device 304 indicates that a signal of the planned neighbor cell 306 is unreachable, and the handover execution fails.

Figure 4:
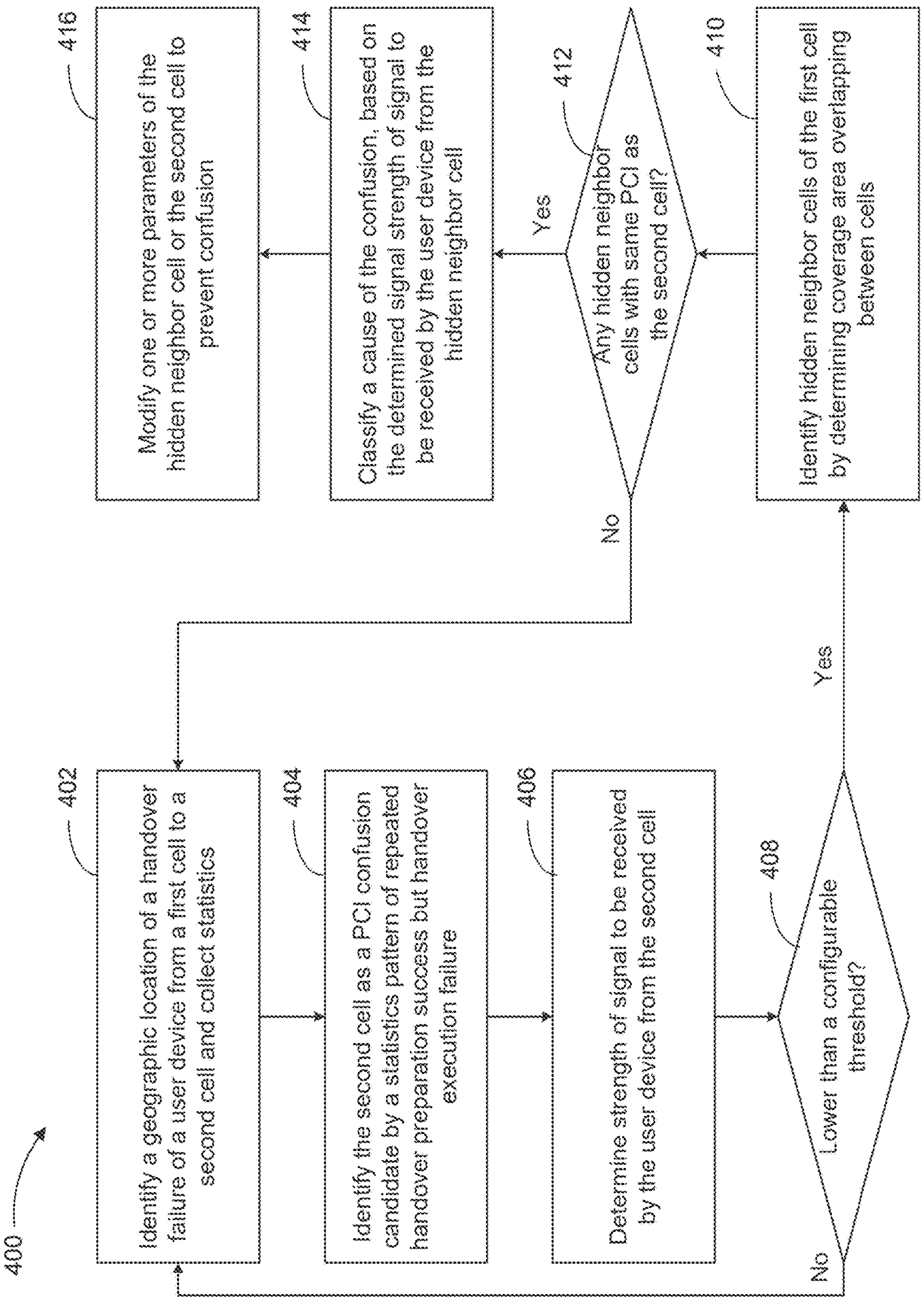
FIG. 4 is an illustration of a flow diagram of a process for detecting PCI confusion, in accordance with an implementation.

Referring now to FIG. 4, a method 400 for identifying PCI confusion is shown, according to an example embodiment. The method 400 can be performed by a data processing system (the data processing system 110, shown and described with reference to FIG. 1). The method 400 may include more or fewer operations and the operations may be performed in any order. Performance of the method 400 may enable the data processing system to detect PCT confusion between cells.

At process 402, the handover statistic manager 122 identifies a geographic location of a handover failure of a user device from a first cell (e.g., a serving cell) to a second cell (e.g., an intended target cell). The confusion identifier 128 (e.g., or the cell manager 124) may further collect statistics of the failed handover (e.g., a timestamp, cell data, etc.).

At process 404, the confusion identifier 128 identifies the second cell as a PCI confusion candidate. For example, the confusion identifier 128 identifies the second cell as a PCI confusion candidate by identifying a pattern of handover statistics that indicate repeated handover preparation success but handover execution failure. For example, the confusion identifier 128 may identify that handover preparation between the first cell and the second cell has been previously successful (e.g., preparation successes have occurred above a threshold number of times), but handover execution between the first cell and the second cell has been previously unsuccessful (e.g., execution failures have occurred above a threshold number of times). When the confusion identifier 128 identifies these patterns, the confusion identifier 128 may determine that the second cell is a PCI confusion candidate and the first cell may have an associated hidden neighbor cell causing the handover execution failures.

At process 406, the confusion identifier 128 determines a strength of a signal to be received by the user device from the second cell. The confusion identifier 128 can do so by calculating the strength of the signal to be received by the user device from the second cell according to the equation $$P(\text{dBm}) = \text{Power} + \text{Gain} - \text{Loss} - 1.2\left(\frac{\theta^2}{HBW^2}\right) - 1.2\left(\frac{\phi^2}{VBW^2}\right)$$

where Power, Gain, Loss, HBW, and VBW correspond to values associated with a configuration of the second cell.

$$1.2\left(\frac{\theta^2}{HBW^2}\right)$$

may be a horizontal angular loss of the determined signal and $$1.2\left(\frac{\phi^2}{VBW^2}\right)$$

may be a vertical angular loss of the determined signal.

At process 408, the confusion identifier 128 determines whether the strength of the signal to be received from the second cell is lower than a configurable threshold value. Responsive to a determination that the strength of the signal to be received is lower than the configurable threshold value, the method 400 continues to process 410. Responsive to a determination that the strength of the signal to be received is not lower than the configurable threshold value (e.g., is at or above the configurable threshold value), the method 400 returns to process 402.

At process 410, the confusion identifier 128 identifies hidden neighbor cells of the first cell. For example, the confusion identifier 128 determines an area of overlapping coverage between cells (e.g., between the first cell and any other cells determined to have a coverage area or location near or overlapping with the first cell). The confusion identifier 128 may identify other hidden neighbor cells by, for example, querying the list of cells associated with the first, serving cell or otherwise retrieving information from the list of cells. The confusion identifier 128 may retrieve information indicating a plurality of cells that may be potential hidden neighbor cells, cells that have previously successfully performed a handover execution with the first cell, etc.

At process 412, the confusion identifier 128 determines whether the hidden neighbor cells identified at process 410 have the same PCI as the second cell. Responsive to a determination that the hidden neighbor cell(s) have the same PCI as the second cell, the method 400 proceeds to process 414. Responsive to a determination that the other hidden neighbor cell(s) do not have the same PCI as the second cell, the method 400 returns to process 402.

At process 414, the confusion classifier 132 classifies a cause of the PCI confusion. For example, based on a determined signal strength to be received by the user device from the hidden neighbor cell, the confusion classifier 132 may determine a type of PCI confusion (e.g., misallocation, overshooting, or reflection).

At process 416, the exporter 134 may modify one or more parameters of the hidden neighbor cell and/or the second cell to prevent confusion between the cells. For example, the exporter 134 may modify one or more parameters (e.g., changing a tilt of an antenna of the cell, changing the power or strength of the signal emitted by the cell, changing a horizonal or vertical beam width of the cell, an angle of the cell, etc.) of the hidden neighbor cell or the second cell.

Figure 5:
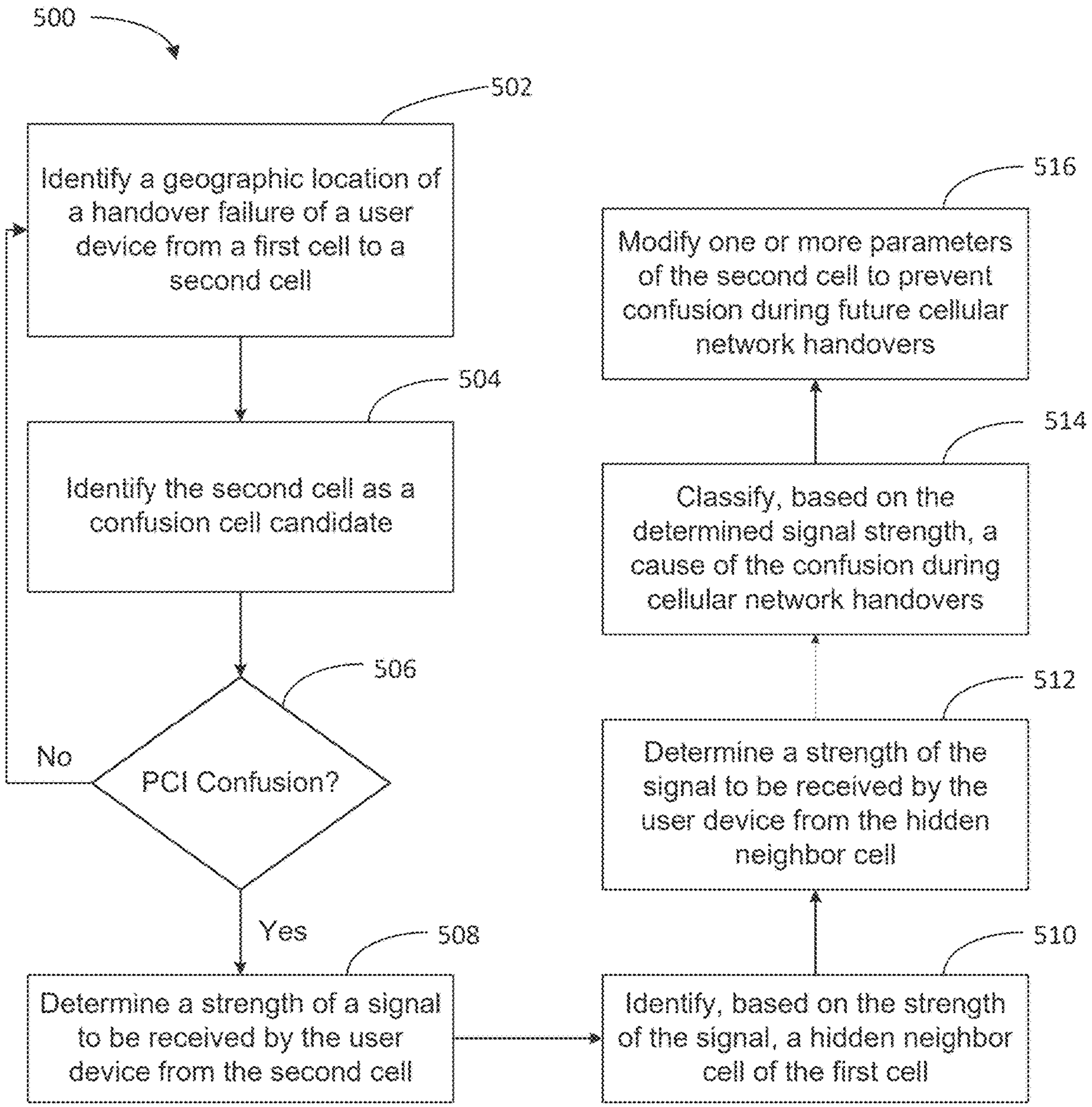
FIG. 5 is an illustration of a flow diagram of a process for detecting PCI confusion, in accordance with an implementation.

FIG. 5 is an illustration of a flow diagram of a process 500 for detecting PCI confusion, in accordance with an implementation. The process 500 can be performed by a data processing system (the data processing system 110, shown and described with reference to FIG. 1). The process 500 may include more or fewer operations and the operations may be performed in any order. One or more of the operations of the process 500 may be performed during the performance of the method 400. Performance of the process 500 may enable the data processing system to detect PCI confusion between cells.

At operation 502, the handover statistic manager 122 identifies a geographic location of a handover failure of a user device (e.g., the client device 106) from a first cell (e.g., a serving cell) to a second cell (e.g., an intended target cell). In various embodiments, each of the coverage areas of the first and second cells include geographic locations covered by frequencies emitted by each of the first and second cells At operation 504, the confusion identifier 128 identifies the second cell as a confusion cell candidate. The confusion identifier 128 identifies the second cell as a confusion cell candidate by determining, based on the identified geographic location, a coverage area for each of the first and second cells. The confusion identifier 128 further identifies the second cell as a confusion cell candidate by determining one or more overlapping coverage areas between the first cell and the second cell based on the coverage areas of the first and second cells.

At process 506, the confusion identifier 128 determines whether PCI confusion exists. For example, the confusion identifier 128 determines whether PCI confusion exists by collecting a plurality of PCI confusion values for the first and second cells. The PCI confusion values may include at least one of: a handover timestamp, an identification of the first cell, an identification of the second cell, an identifier of the user device, a geolocation of the user device, handover preparation statistics, or handover execution metrics. The confusion identifier 128 further determines whether PCI confusion exists by identifying a pattern of repeated PCI confusion based on the plurality of PCI confusion values. In some embodiments, the pattern of repeated PCI confusion indicates that a hidden neighbor cell exists for the first cell. As will be described herein, the confusion identifier 128 may determine a hidden neighbor cell of the first cell based on the identified pattern of repeated PCI confusion.

In some embodiments, identifying the pattern of repeated PCI confusion includes determining that a number of matches between the collected PCI confusion values for the first cell and the collected PCI confusion values for the second cell exceeds a threshold value.

Responsive to determining at process 506 that PCI confusion exists, the method 500 continues to process 508.

Response to determining at process 506 that PCI confusion does not exist, the method 500 returns to process 502.

At process 508, the confusion identifier determines a strength of a signal to be received by the user device from the second cell. In various embodiments, process 508 further includes identifying, by the confusion identifier 128, the second cell as the confusion cell candidate based on the strength of the signal to be received by the user device from the second cell being lower than a threshold value. That is, in some embodiments, the confusion identifier 128 may further determine that PCI confusion exists and that the second cell is a confusion cell candidate based on the signal from the second cell being lower than a threshold value, indicating that a hidden neighbor cell may exist.

In some embodiments, determining the strength of the signal to be received by the user device from the second cell includes: determining, by the confusion identifier 128, cell information for the second cell. The cell information may include at least one of: a cell identifier, a PCI value, a frequency, a geolocation, a cell antenna azimuth, a cell down tilt, a cell horizontal beam width, a cell vertical beam width, a pilot power, a cell antenna gain, or a transmission loss. In some embodiments, determining the strength of the signal to be received by the user device from the second cell further includes calculating the strength of the signal to be received by the user device from the second cell according to the equation $$P(\text{dBm}) = \text{Power} + \text{Gain} - \text{Loss} - 1.2\left(\frac{\theta^2}{HBW^2}\right) - 1.2\left(\frac{\phi^2}{VBW^2}\right)$$

where Power, Gain, Loss, HBW, and VBW correspond to values associated with a configuration of the second cell. In some embodiments, $$1.2\left(\frac{\theta^2}{HBW^2}\right)$$

is a horizontal angular loss of the determined signal and wherein $$1.2\left(\frac{\phi^2}{VBW^2}\right)$$

is a vertical angular loss of the determined signal.

At process 510, the confusion identifier 128 identifies, based on the strength of the signal to be received by the user device from the second cell, a hidden neighbor cell of the first cell. The confusion identifier 128 may identify the hidden neighbor cell by querying a table associated with the first cell. The table may include a list of potential hidden neighbor cells of the first cell.

In various embodiments, the second cell is an intended target of the handover and the hidden neighbor cell is an unintended target of the handover. In some embodiments, process 510 further includes identifying the hidden neighbor cell as a potential cause of the handover failure based on the hidden neighbor cell having a same PCI as the second cell.

In some embodiments, process 510 further includes identifying the hidden neighbor cell of the first cell as causing confusion with the second cell. The confusion identifier 128 may identify the hidden neighbor cell of the first cell as causing confusion with the second cell by determining one or more overlapping coverage areas between the first cell and the hidden neighbor cell based on the coverage area of the first cell and a coverage area of the hidden neighbor cell. In some embodiments, each of the coverage areas of the first cell and the hidden neighbor cell include geographic locations covered by frequencies emitted by each of the first cell and the hidden neighbor cell. In some embodiments, the hidden neighbor cell is identified among the plurality of potential hidden neighbor cells as causing confusion with the second cell. In some embodiments, identifying the hidden neighbor cell further includes determining, by the confusion identifier 128, that the strength of the signal to be received by the user device from the hidden neighbor cell is greater than the strength of the signal to be received by the user device from the second cell.

At process 512, the confusion identifier 128 determines a strength of a signal to be received by the user device from the hidden neighbor cell. In some embodiments, the handover failure occurs between the first cell and the second cell because the signal strength of the second cell is less than a signal strength of the hidden neighbor cell.

In some embodiments, process 512 further includes determining, by the confusion identifier 128 and/or the confusion identifier 132, cell information for the hidden neighbor cell. The cell information may include at least one of: a cell identifier, a PCI value, a frequency, a geolocation, a cell antenna azimuth, a cell down tilt, a cell horizontal beam width, a cell vertical beam width, a pilot power, a cell antenna gain, or a transmission loss. In some embodiments, determining the strength of the signal to be received by the user device from the hidden neighbor cell further includes calculating the strength of the signal to be received by the user device from the second cell according to the equation $$P(\text{dBm}) = \text{Power} + \text{Gain} - \text{Loss} - 1.2\left(\frac{\theta^2}{HBW^2}\right) - 1.2\left(\frac{\phi^2}{VBW^2}\right)$$

where Power, Gain, Loss, HBW, and VBW correspond to values associated with a configuration of the second cell. In some embodiments, $$1.2\left(\frac{\theta^2}{HBW^2}\right)$$

is a horizontal angular loss of the determined signal and wherein $$1.2\left(\frac{\phi^2}{VBW^2}\right)$$

is a vertical angular loss of the determined signal.

At process 514, the confusion classifier 132 classifies, based on the determined signal strength of the hidden neighbor cell, a cause of the confusion during cellular network handovers.

In some embodiments, process 514 further includes identifying, by the confusion classifier 132, the hidden neighbor cell as the potential cause of the handover failure based on a signal overshoot from the hidden neighbor cell. In some embodiments, the signal overshoot causes a signal overlap between the determined signal of the first cell and the determined signal of the hidden neighbor cell.

In some embodiments, process 514 further includes identifying, by the confusion classifier 132, the hidden neighbor cell as the potential cause of the handover failure based on a reflection of a signal of the hidden neighbor cell. In some embodiments, the reflection of the signal creates an overlapping area between the signal of the hidden neighbor cell and a signal of the first cell.

At process 516, the exporter 134 modifies, based on the classified cause of confusion, one or more parameters of the second cell and/or the hidden neighbor cell to prevent confusion during future cellular network handovers. For example, the exporter 134 may modify one or more parameters (e.g., changing a tilt of an antenna of the cell, changing the power or strength of the signal emitted by the cell, changing a horizonal or vertical beam width of the cell, an angle of the cell, etc.) to prevent the signal from the second cell from overlapping with the signal from the first cell.

Figure 6A:
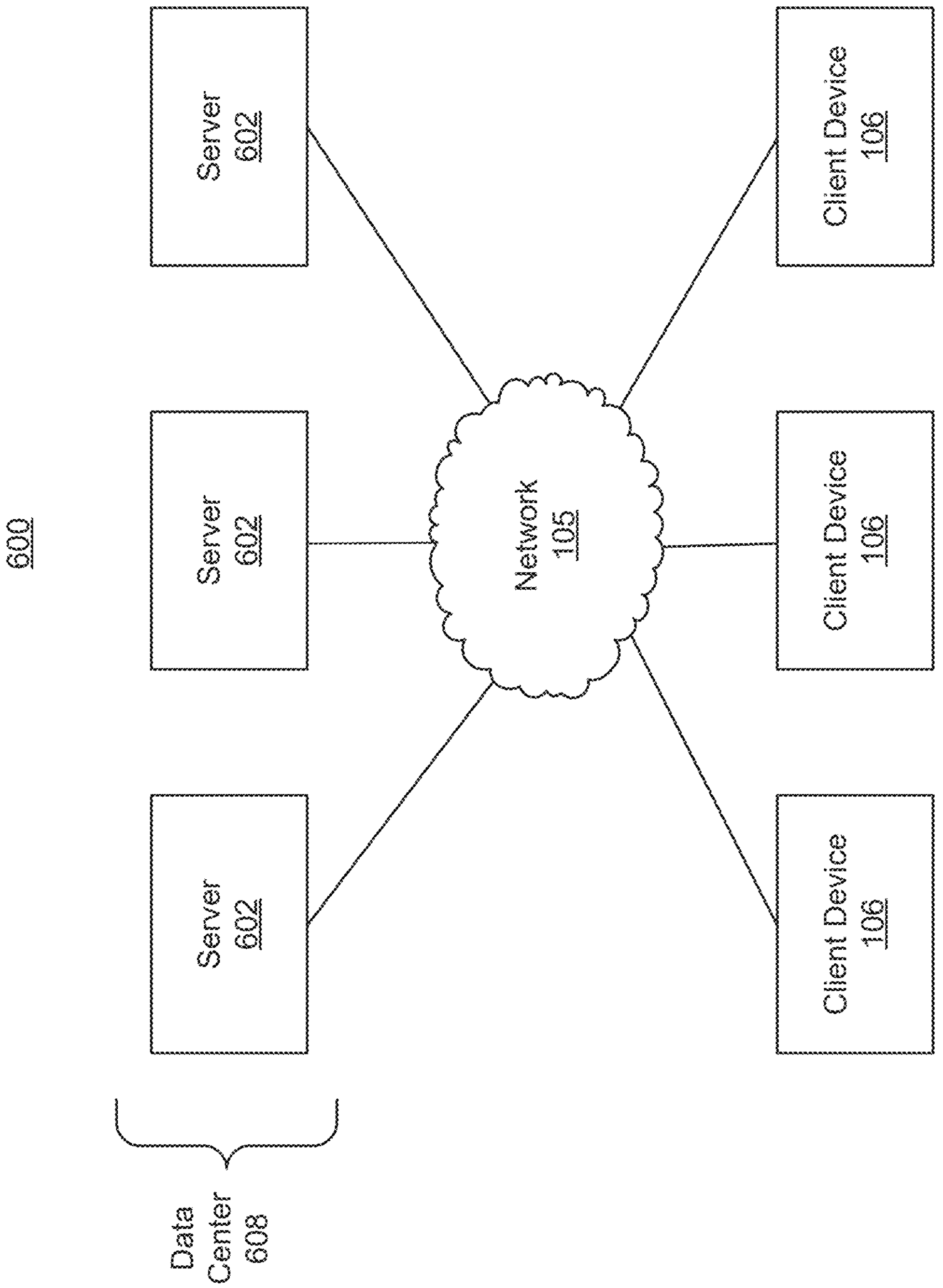
FIG. 6A is a block diagram depicting an implementation of a network environment including a client device in communication with a server device.

FIG. 6A depicts an example network environment that can be used in connection with the methods and systems described herein. In brief overview, the network environment 600 includes one or more client devices 106 (also generally referred to as clients, client node, client machines, client computers, client computing devices, endpoints, or endpoint nodes) in communication with one or more servers 602 (also generally referred to as servers, nodes, or remote machine) via one or more networks 105. In some embodiments, a client 106 has the capacity to function as both a client node seeking access to resources provided by a server and as a server providing access to hosted resources for other client devices 106.

Although FIG. 6A shows a network 105 between the client devices 106 and the servers 602, the client devices 106 and the servers 602 can be on the same network 105. In embodiments, there are multiple networks 105 between the client devices 106 and the servers 602. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g., FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g., Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 600 can include multiple, logically grouped servers 602. The logical group of servers can be referred to as a data center 608 (or server farm or machine farm). In embodiments, the servers 602 can be geographically dispersed. The data center 608 can be administered as a single entity or different entities. The data center 608 can include multiple data centers 608 that can be geographically dispersed. The servers 602 within each data center 608 can be homogeneous or heterogeneous (e.g., one or more of the servers 602 or machines 602 can operate according to one type of operating system platform (e.g., WINDOWS NT, manufactured by Microsoft Corp. of Redmond, Washington), while one or more of the other servers 602 can operate on according to another type of operating system platform (e.g., Unix, Linux, or Mac OS X)). The servers 602 of each data center 608 do not need to be physically proximate to another server 602 in the same machine farm 608. Thus, the group of servers 602 logically grouped as a data center 608 can be interconnected using a network. Management of the data center 608 can be de-centralized. For example, one or more servers 602 can comprise components, subsystems and modules to support one or more management services for the data center 608.

Server 602 can be a file server, application server, web server, proxy server, appliance, network appliance, gateway, gateway server, virtualization server, deployment server, SSL VPN server, or firewall. In embodiments, the server 602 can be referred to as a remote machine or a node. Multiple nodes can be in the path between any two communicating servers.

Figure 6B:
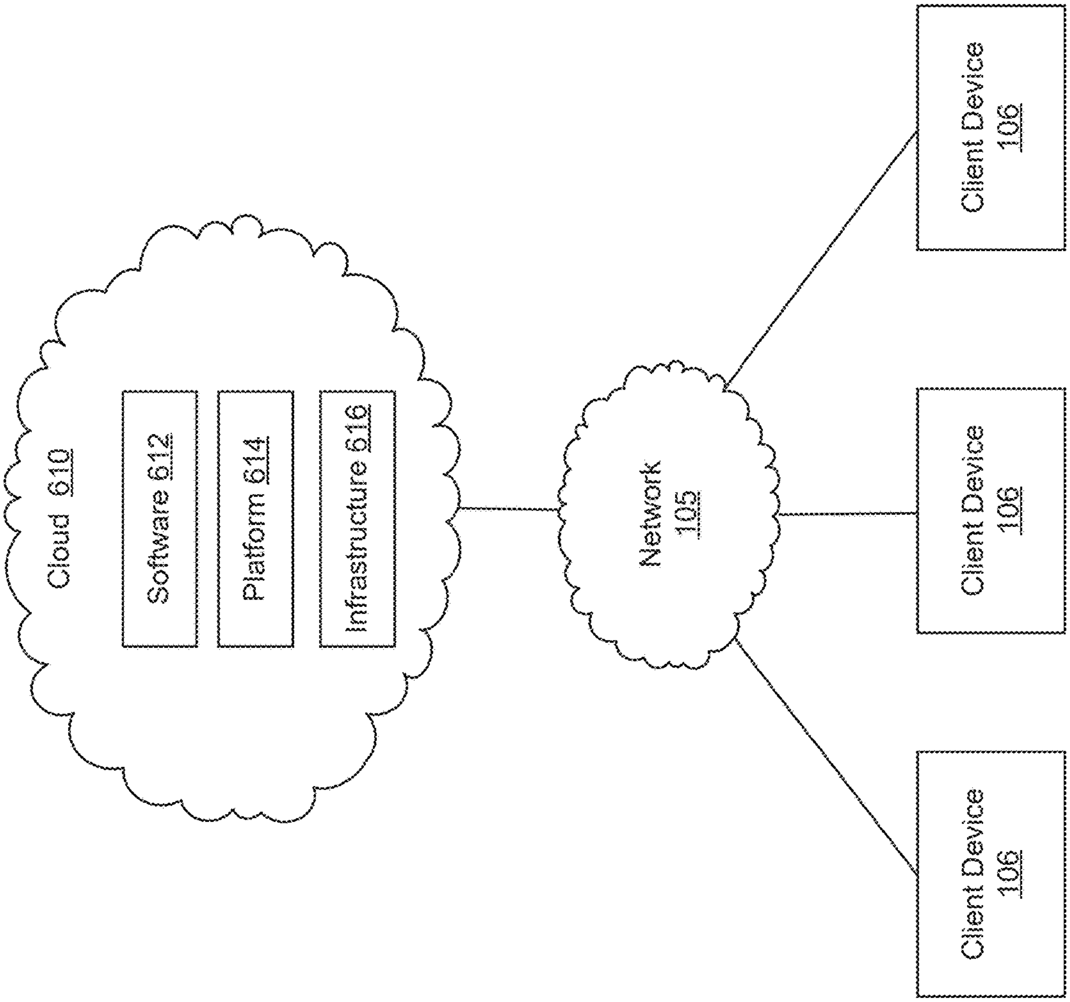
FIG. 6B is a block diagram depicting a cloud computing environment including a client device in communication with cloud service providers.

FIG. 6B illustrates an example cloud computing environment. A cloud computing environment 601 can provide client 106 with one or more resources provided by a network environment. The cloud computing environment 601 can include one or more client devices 106, in communication with the cloud 610 over one or more networks 105. Client devices 106 can include, e.g., thick clients, thin clients, and zero clients. A thick client can provide at least some functionality even when disconnected from the cloud 610 or servers 602. A thin client or a zero client can depend on the connection to the cloud 610 or server 602 to provide functionality. A zero client can depend on the cloud 610 or other networks 105 or servers 602 to retrieve operating system data for the client device. The cloud 610 can include back-end platforms, e.g., servers 602, storage, server farms or data centers.

The cloud 610 can be public, private, or hybrid. Public clouds can include public servers 602 that are maintained by third parties to the client devices 106 or the owners of the clients. The servers 602 can be located off-site in remote geographical locations as disclosed above or otherwise. Public clouds can be connected to the servers 602 over a public network. Private clouds can include private servers 602 that are physically maintained by client devices 106 or owners of clients. Private clouds can be connected to the servers 602 over a private network 105. Hybrid clouds 608 can include both the private and public networks 105 and servers 602.

The cloud 610 can also include a cloud-based delivery, e.g., Software as a Service (SaaS) 612, Platform as a Service (PaaS) 614, and the Infrastructure as a Service (IaaS) 616. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 106 and server 602 can be deployed as and/or executed on any type and form of computing device, e.g., a computer, network device or appliance capable of communicating on any type and form of network and performing the operations described herein.

Figure 6C:
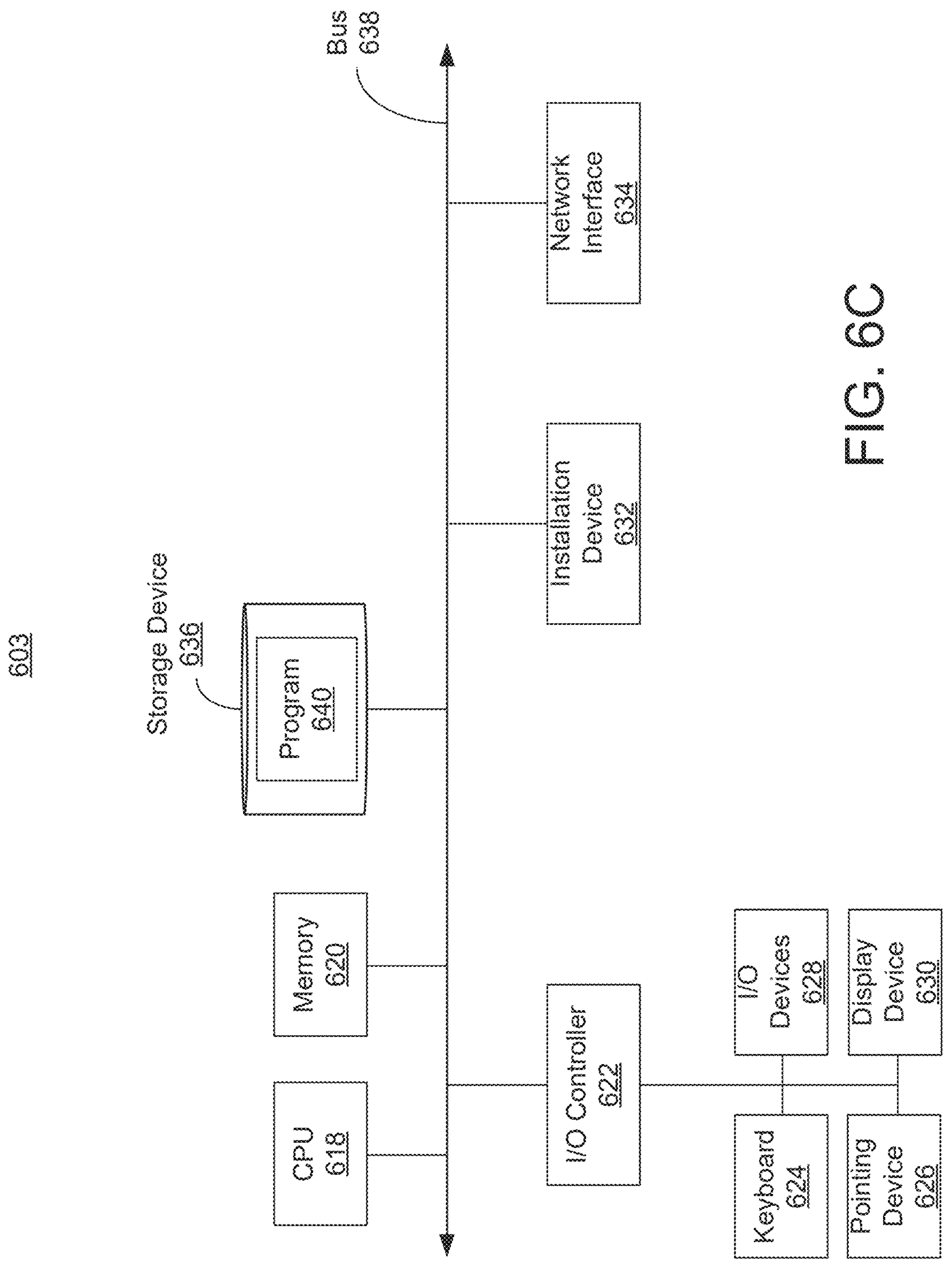
FIG. 6C is a block diagram depicting an implementation of a device that can be used in connection with the systems depicted in FIGS. 1 and 2, and the methods depicted in FIGS. 3-5.

FIG. 6C depicts block diagrams of a computing device 603 useful for practicing an embodiment of the client 106 or a server 602. As shown in FIG. 6C, each computing device 603 can include a central processing unit 618, and a main memory unit 620. As shown in FIG. 6C, a computing device 603 can include one or more of a storage device 636, an installation device 632, a network interface 634, an I/O controller 622, a display device 630, a keyboard 624 or a pointing device 626, e.g., a mouse. The storage device 636 can include, without limitation, a program 640, such as an operating system, software, or software associated with system 100.

The central processing unit 618 is any logic circuitry that responds to and processes instructions fetched from the main memory unit 620. The central processing unit 618 can be provided by a microprocessor unit, e.g.: those manufactured by Intel Corporation of Mountain View, California. The computing device 603 can be based on any of these processors, or any other processor capable of operating as described herein. The central processing unit 618 can utilize instruction level parallelism, thread level parallelism, different levels of cache, and multi-core processors. A multi-core processor can include two or more processing units on a single computing component.

Main memory unit 620 can include one or more memory chips capable of storing data and allowing any storage location to be directly accessed by the microprocessor 618. Main memory unit 620 can be volatile and faster than storage 636 memory. Main memory units 620 can be Dynamic random-access memory (DRAM) or any variants, including static random access memory (SRAM). The memory 620 or the storage 636 can be non-volatile; e.g., non-volatile read access memory (NVRAM). The memory 620 can be based on any type of memory chip, or any other available memory chips. In the example depicted in FIG. 6C, the processor 618 can communicate with memory 620 via a system bus 638.

A wide variety of I/O devices 628 can be present in the computing device 603. Input devices 628 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 628 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 628, display devices 630 or group of devices can be augmented reality devices. The I/O devices can be controlled by an I/O controller 622 as shown in FIG. 6C. The I/O controller 622 can control one or more I/O devices, such as, e.g., a keyboard 624 and a pointing device 626, e.g., a mouse or optical pen. Furthermore, an I/O device can also provide storage and/or an installation device 632 for the computing device 603. In embodiments, the computing device 603 can provide USB connections (not shown) to receive handheld USB storage devices. In embodiments, an I/O device 628 can be a bridge between the system bus 638 and an external communication bus, e.g., a USB bus, a SCSI bus, a FireWire bus, an Ethernet bus, a Gigabit Ethernet bus, a Fibre Channel bus, or a Thunderbolt bus.

In embodiments, display devices 630 can be connected to I/O controller 622. Display devices can include, e.g., liquid crystal displays (LCD), electronic papers (e-ink) displays, flexile displays, light emitting diode displays (LED), or other types of displays. In some embodiments, display devices 630 or the corresponding I/O controllers 622 can be controlled through or have hardware support for OPENGL or DIRECTX API or other graphics libraries. Any of the I/O devices 628 and/or the I/O controller 622 can include any type and/or form of suitable hardware, software, or combination of hardware and software to support, enable or provide for the connection and use of one or more display devices 630 by the computing device 603. For example, the computing device 603 can include any type and/or form of video adapter, video card, driver, and/or library to interface, communicate, connect or otherwise use the display devices 630. In embodiments, a video adapter can include multiple connectors to interface to multiple display devices 630.

The computing device 603 can include a storage device 636 (e.g., one or more hard disk drives or redundant arrays of independent disks) for storing an operating system or other related software, and for storing application software programs 640 such as any program related to the systems, methods, components, modules, elements, or functions depicted in FIG. 1, or 2. Examples of storage device 636 include, e.g., hard disk drive (HDD); optical drive including CD drive, DVD drive, or BLU-RAY drive; solid-state drive (SSD); USB flash drive; or any other device suitable for storing data. Storage devices 636 can include multiple volatile and non-volatile memories, including, e.g., solid state hybrid drives that combine hard disks with solid state cache. Storage devices 636 can be non-volatile, mutable, or read-only. Storage devices 636 can be internal and connect to the computing device 603 via a bus 638. Storage device 636 can be external and connect to the computing device 603 via an I/O device 630 that provides an external bus. Storage device 636 can connect to the computing device 603 via the network interface 634 over a network 105. Some client devices 106 may not require a non-volatile storage device 636 and can be thin clients or zero client devices 106. Some storage devices 636 can be used as an installation device 632 and can be suitable for installing software and programs.

The computing device 603 can include a network interface 634 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 603 can communicate with other computing devices 602 via any type and/or form of gateway or tunneling protocol e.g., Secure Socket Layer (SSL) or Transport Layer Security (TLS), QUIC protocol, or the Citrix Gateway Protocol manufactured by Citrix Systems, Inc. of Ft. Lauderdale, Florida. The network interface 634 can include a built-in network adapter, network interface card, PCMCIA network card, EXPRESSCARD network card, card bus network adapter, wireless network adapter, USB network adapter, modem or any other device suitable for interfacing the computing device 603 to any type of network capable of communication and performing the operations described herein.

A computing device 603 of the sort depicted in FIG. 6C can operate under the control of an operating system, which controls scheduling of tasks and access to system resources. The computing device 603 can be running any operating system configured for any type of computing device, including, for example, a desktop operating system, a mobile device operating system, a tablet operating system, or a smartphone operating system.

The computing device 603 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 603 has sufficient processor power and memory capacity to perform the operations described herein. In some embodiments, the computing device 603 can have different processors, operating systems, and input devices consistent with the device.

In embodiments, the status of one or more machines 106, 603 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 603 in response to the CPU 618 executing an arrangement of instructions contained in main memory 620. Such instructions can be read into main memory 620 from another computer-readable medium, such as the storage device 636. Execution of the arrangement of instructions contained in main memory 620 causes the computing device 603 to perform the illustrative processes described herein. One or more processors in a multi-processing arrangement may also be employed to execute the instructions contained in main memory 620. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

At least one aspect relates to a method for detecting physical cell identity (PCI) confusion during cellular network handovers. The method includes identifying, by one or more processors, a geographic location of a handover failure of a user device from a first cell to a second cell, determining, by the one or more processors, a strength of a signal to be received by the user device from the second cell, identifying, by the one or more processors, based on the strength of the signal to be received by the user device from the second cell, a hidden neighbor cell of the first cell by querying a table associated with the first cell, the table including a list of potential hidden neighbor cells of the first cell, determining, by the one or more processors, a strength of a signal to be received by the user device from the hidden neighbor cell, classifying, by the one or more processors and based on the determined signal strength of the hidden neighbor cell, a cause of the confusion during cellular network handovers, and modifying, by the one or more processors and based on the classified cause of confusion, one or more parameters of the second cell or the hidden neighbor cell to prevent confusion during future cellular network handovers.

In some embodiments, each of the coverage areas of the first and second cells include geographic locations covered by frequencies emitted by each of the first and second cells. In some embodiments, the second cell is an intended target of the handover and the hidden neighbor cell is an unintended target of the handover. In some embodiments, the handover failure occurs between the first cell and the second cell because the signal strength of the second cell is less than the signal strength of the hidden neighbor cell.

In some embodiments, the method further includes identifying the second cell as a confusion cell candidate by: determining, by the one or more processors, based on the identified geographic location, a coverage area for each of the first and second cells, determining, by the one or more processors, one or more overlapping coverage areas between the first cell and the second cell based on the coverage areas of the first and second cells, collecting, by the one or more processors, a plurality of PCI confusion values for the first and second cells including at least one of: a handover timestamp, an identification of the first cell, an identification of the second cell, an identifier of the user device, a geolocation of the user device, handover preparation statistics, or handover execution metrics, and identifying, by the one or more processors, a pattern of repeated PCI confusion based on the plurality of PCI confusion values. In some embodiments, the pattern of repeated PCI confusion indicates that a hidden neighbor cell exists for the first cell, and the one or more processors determine the hidden neighbor cell of the first cell based on the identified pattern of repeated PCI confusion.

In some embodiments, identifying the pattern of repeated PCI confusion includes determining, by the one or more processors, that a number of matches between the collected PCI confusion values for the first cell and the collected PCI confusion values for the second cell exceeds a threshold value. In some embodiments the method further includes identifying, by the one or more processors, the second cell as the confusion cell candidate based on the strength of the signal to be received by the user device from the second cell being lower than a threshold value. In some embodiments, determining the strength of the signal to be received by the user device from the second cell or the hidden neighbor cell includes: determining, by the one or more processors, cell information for the second cell or the hidden neighbor cell, the cell information including at least one of: a cell identifier, a PCI value, a frequency, a geolocation, a cell antenna azimuth, a cell down tilt, a cell horizontal beam width, a cell vertical beam width, a pilot power, a cell antenna gain, or a transmission loss.

In some embodiments the method includes calculating, by the one or more processors, the strength of the signal to be received by the user device from the second cell or the hidden neighbor cell according to the equation $$P(\text{dBm}) = \text{Power} + \text{Gain} - \text{Loss} - 1.2\left(\frac{\theta^2}{HBW^2}\right) - 1.2\left(\frac{\phi^2}{VBW^2}\right)$$

where Power, Gain, Loss, HBW, and VBW correspond to values associated with a configuration of the second cell or the hidden neighbor cell, wherein $$1.2\left(\frac{\theta^2}{HBW^2}\right)$$

is a horizontal angular loss of the determined signal and wherein $$1.2\left(\frac{\phi^2}{VBW^2}\right)$$

is a vertical angular loss of the determined signal.

In some embodiments the method further includes identifying, by the one or more processors, the hidden neighbor cell of the first cell as causing confusion with the second cell by: determining one or more overlapping coverage areas between the first cell and the hidden neighbor cell based on the coverage area of the first cell and a coverage area of the hidden neighbor cell, wherein each of the coverage areas of the first cell and the hidden neighbor cell comprise geographic locations covered by frequencies emitted by each of the first cell and the hidden neighbor cell. In some embodiments, the hidden neighbor cell is identified among the plurality of potential hidden neighbor cells as causing confusion with the second cell. In some embodiments, identifying the hidden neighbor cell further includes: determining, by the one or more processors, that the strength of the signal to be received by the user device from the hidden neighbor cell is greater than the strength of the signal to be received by the user device from the second cell. In some embodiments, the method further includes identifying, by the one or more processors, the hidden neighbor cell as a potential cause of the handover failure based on the hidden neighbor cell having a same PCI as the second cell.

In some embodiments, the method further includes identifying, by the one or more processors, the hidden neighbor cell as the potential cause of the handover failure based on a signal overshoot from the hidden neighbor cell, wherein the signal overshoot causes a signal overlap between the determined signal of the first cell and the determined signal of the hidden neighbor cell. In some embodiments, the method further includes identifying, by the one or more processors, the hidden neighbor cell as the potential cause of the handover failure based on a reflection of a signal of the hidden neighbor cell, wherein the reflection of the signal creates an overlapping area between the signal of the hidden neighbor cell and a signal of the first cell.

At least one aspect relates to a system for detecting physical cell identity (PCI) confusion during cellular network handovers. The system includes one or more non-transitory computer-readable media storing instruction thereon that, when executed by one or more processors, cause the one or more processors to perform operations including: identifying a geographic location of a handover failure of a user device from a first cell to a second cell, determining a strength of a signal to be received by the user device from the second cell, determining, based on the strength of the signal to be received by the user device from the second cell, a hidden neighbor cell of the first cell by querying a table associated with the first cell, the table including a list of potential hidden neighbor cells of the first cell, determining a strength of a signal to be received by the user device from the hidden neighbor cell, classifying, based on the determined signal strength of the hidden neighbor cell, a cause of the confusion during cellular network handovers, and modifying, based on the classified cause of confusion, one or more parameters of the second cell or the hidden neighbor cell to prevent confusion during future cellular network handovers.

In some embodiments, the system further includes identifying the second cell as a confusion cell candidate by: determining, based on the identified geographic location, a coverage area for each of the first and second cells, determining one or more overlapping coverage areas between the first cell and the second cell based on the coverage areas of the first and second cells, collecting a plurality of PCI confusion values for the first, and second cells including at least one of: a handover timestamp, an identification of the first cell, an identification of the second cell, an identifier of the user device, a geolocation of the user device, handover preparation statistics, or handover execution metrics, and identifying a pattern of repeated PCI confusion based on the plurality of PCI confusion values. In some embodiments, identifying the pattern of repeated PCI confusion includes determining that a number of matches between the collected PCI confusion values for the first cell and the collected PCI confusion values for the second cell exceeds a threshold value.

In some embodiments, determining the strength of the signal to be received by the user device from the second cell or the hidden neighbor includes: determining, by the one or more processors, cell information for the second cell or the hidden neighbor, the cell information including at least one of: a cell identifier, a PCI value, a frequency, a geolocation, a cell antenna azimuth, a cell down tilt, a cell horizontal beam width, a cell vertical beam width, a pilot power, a cell antenna gain, or a transmission loss, and calculating, by the one or more processors, the strength of the signal to be received by the user device from the second cell or the hidden neighbor according to the equation $$P(\text{dBm}) = \text{Power} + \text{Gain} - \text{Loss} - 1.2\left(\frac{\theta^2}{HBW^2}\right) - 1.2\left(\frac{\phi^2}{VBW^2}\right)$$

where Power, Gain, Loss, HBW, and VBW correspond to values associated with a configuration of the second cell or the hidden neighbor, wherein $$1.2\left(\frac{\theta^2}{HBW^2}\right)$$

is a horizontal angular loss of the determined signal and wherein $$1.2\left(\frac{\phi^2}{VBW^2}\right)$$

is a vertical angular loss of the determined signal.

At least one aspect relates to one or more non-transitory computer-readable storage media storing instructions thereon that, when executed by one or more processors, cause the one or more processors to perform operations including: identifying a geographic location of a handover failure of a user device from a first cell to a second cell, determining a strength of a signal to be received by the user device from the second cell, determining, based on the strength of the signal to be received by the user device from the second cell, a hidden neighbor cell of the first cell by querying a table associated with the first cell, the table including a list of potential hidden neighbor cells of the first cell, determining a strength of a signal to be received by the user device from the hidden neighbor cell, classifying, based on the determined signal strength of the hidden neighbor cell, a cause of the confusion during cellular network handovers, and modifying, based on the classified cause of confusion, one or more parameters of the second cell to prevent confusion during future cellular network handovers.

In some embodiments, the instructions further cause the one or more processors to perform operations including identifying the second cell as a confusion cell candidate by: determining, based on the identified geographic locations, a coverage area for each of the first and second cells, determining one or more overlapping coverage areas between the first cell and the second cell based on the coverage areas of the first and second cells, collecting a plurality of PCI confusion values for the first and second cells including at least one of: a handover timestamp, an identification of the first cell, an identification of the second cell, an identifier of the user device, a geolocation of the user device, handover preparation statistics, or handover execution metrics, and identifying a pattern of repeated PCI confusion based on the plurality of PCI confusion values. In some embodiments, identifying the pattern of repeated PCI confusion determining that a number of matches between the collected PCI confusion values for the second cell and the collected PCI confusion values for the second cell exceeds a threshold value.

In some embodiments, determining the strength of the signal to be received by the user device from the second cell or the hidden neighbor cell includes: determining cell information for the second cell or the hidden neighbor cell, the cell information including at least one of: a cell identifier, a PCI value, a frequency, a geolocation, a cell antenna azimuth, a cell down tilt, a cell horizontal beam width, a cell vertical beam width, a pilot power, a cell antenna gain, or a transmission loss, and calculating, by the one or more processors, the strength of the signal to be received by the user device from the second cell or the hidden neighbor cell according to the equation $$P(\text{dBm}) = \text{Power} + \text{Gain} - \text{Loss} - 1.2\left(\frac{\theta^2}{HBW^2}\right) - 1.2\left(\frac{\phi^2}{VBW^2}\right)$$

where Power, Gain, Loss, HBW, and VBW correspond to values associated with a configuration of the second cell or the hidden neighbor cell, wherein $$1.2\left(\frac{\theta^2}{HBW^2}\right)$$

is a horizontal angular loss of the determined signal and wherein $$1.2\left(\frac{\phi^2}{VBW^2}\right)$$

is a vertical angular loss of the determined signal.

The foregoing detailed description includes illustrative examples of various aspects and embodiments and provides an overview or framework for understanding the nature and character of the claimed aspects and embodiments. The drawings provide illustration and a further understanding of the various aspects and embodiments and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all embodiments, and the described program components can be included in a single hardware or software product.

The phraseology and terminology used herein is for the purpose of description and should not be regarded as limiting. Any references to embodiments or elements or acts of the systems and methods herein referred to in the singular may also embrace embodiments including a plurality of these elements, and any references in plural to any implementation or element or act herein may also embrace embodiments including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A,' only 'B', as well as both 'A' and 'B'. Such references used in conjunction with "comprising" or other open terminology can include additional items.

The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for detecting physical cell identity (PCI) confusion during cellular network handovers, comprising:
- identifying, by one or more processors, a geographic location of a handover failure of a user device from a first cell to a second cell;
- determining, by the one or more processors, a strength of a signal to be received by the user device from the second cell;
- identifying, by the one or more processors, based on the strength of the signal to be received by the user device from the second cell, a hidden neighbor cell of the first cell by querying a table associated with the first cell, the table comprising a list of potential hidden neighbor cells of the first cell;
- determining, by the one or more processors, a strength of a signal to be received by the user device from the hidden neighbor cell;
- classifying, by the one or more processors and based on the determined signal strength of the hidden neighbor cell, a cause of the confusion during cellular network handovers; and
- modifying, by the one or more processors and based on the classified cause of confusion, one or more parameters of the second cell or the hidden neighbor cell to prevent confusion during future cellular network handovers.

2. The method of claim 1, wherein each of the coverage areas of the first and second cells include geographic locations covered by frequencies emitted by each of the first and second cells.

3. The method of claim 1, wherein the second cell is an intended target of the handover and the hidden neighbor cell is an unintended target of the handover, wherein the handover failure occurs between the first cell and the second cell because the signal strength of the second cell is less than the signal strength of the hidden neighbor cell.

4. The method of claim 1, further comprising:

identifying the second cell as a confusion cell candidate by:

determining, by the one or more processors, based on the identified geographic location, a coverage area for each of the first and second cells;

determining, by the one or more processors, one or more overlapping coverage areas between the first cell and the second cell based on the coverage areas of the first and second cells;

collecting, by the one or more processors, a plurality of PCI confusion values for the first and second cells comprising at least one of: a handover timestamp, an identification of the first cell, an identification of the second cell, an identifier of the user device, a geolocation of the user device, handover preparation statistics, or handover execution metrics; and identifying, by the one or more processors, a pattern of repeated PCI confusion based on the plurality of PCI confusion values, wherein the pattern of repeated PCI confusion indicates that a hidden neighbor cell exists for the first cell, and wherein the one or more processors determine the hidden neighbor cell of the first cell based on the identified pattern of repeated PCI confusion.

5. The method of claim 4, wherein identifying the pattern of repeated PCI confusion comprises determining, by the one or more processors, that a number of matches between the collected PCI confusion values for the first cell and the collected PCI confusion values for the second cell exceeds a threshold value.

6. The method of claim 4, further comprising identifying, by the one or more processors, the second cell as the confusion cell candidate based on the strength of the signal to be received by the user device from the second cell being lower than a threshold value.

7. The method of claim 1, wherein determining the strength of the signal to be received by the user device from the second cell or the hidden neighbor cell comprises:

determining, by the one or more processors, cell information for the second cell or the hidden neighbor cell, the cell information comprising at least one of: a cell identifier, a PCI value, a frequency, a geolocation, a cell antenna azimuth, a cell down tilt, a cell horizontal beam width, a cell vertical beam width, a pilot power, a cell antenna gain, or a transmission loss.

8. The method of claim 7, comprising calculating, by the one or more processors, the strength of the signal to be received by the user device from the second cell or the hidden neighbor cell according to the equation $$P(\text{dBm}) = \text{Power} + \text{Gain} - \text{Loss} - 1.2\left(\frac{\theta^2}{HBW^2}\right) - 1.2\left(\frac{\phi^2}{VBW^2}\right)$$

where Power, Gain, Loss, HBW, and VBW correspond to values associated with a configuration of the second cell or the hidden neighbor cell, wherein $$1.2\left(\frac{\theta^2}{HBW^2}\right)$$

is a horizontal angular loss of the determined signal and wherein $$1.2\left(\frac{\phi^2}{VBW^2}\right)$$

is a vertical angular loss of the determined signal.

9. The method of claim 1, further comprising identifying, by the one or more processors, the hidden neighbor cell of the first cell as causing confusion with the second cell by:

determining one or more overlapping coverage areas between the first cell and the hidden neighbor cell based on the coverage area of the first cell and a coverage area of the hidden neighbor cell, wherein each of the coverage areas of the first cell and the hidden neighbor cell comprise geographic locations covered by frequencies emitted by each of the first cell and the hidden neighbor cell.

10. The method of claim 9, wherein the hidden neighbor cell is identified among the plurality of potential hidden neighbor cells as causing confusion with the second cell.

11. The method of claim 10, wherein identifying the hidden neighbor cell further comprises: determining, by the one or more processors, that the strength of the signal to be received by the user device from the hidden neighbor cell is greater than the strength of the signal to be received by the user device from the second cell.

12. The method of claim 10, further comprising identifying, by the one or more processors, the hidden neighbor cell as a potential cause of the handover failure based on the hidden neighbor cell having a same PCI as the second cell.

13. The method of claim 11, comprising identifying, by the one or more processors, the hidden neighbor cell as the potential cause of the handover failure based on a signal overshoot from the hidden neighbor cell, wherein the signal overshoot causes a signal overlap between the determined signal of the first cell and the determined signal of the hidden neighbor cell.

14. The method of claim 11, comprising identifying, by the one or more processors, the hidden neighbor cell as the potential cause of the handover failure based on a reflection of a signal of the hidden neighbor cell, wherein the reflection of the signal creates an overlapping area between the signal of the hidden neighbor cell and a signal of the first cell.

15. A system for detecting physical cell identity (PCI) confusion during cellular network handovers, comprising:

one or more non-transitory computer-readable media storing instruction thereon that, when executed by one or more processors, cause the one or more processors to perform operations comprising:

identifying a geographic location of a handover failure of a user device from a first cell to a second cell;

determining a strength of a signal to be received by the user device from the second cell;

determining, based on the strength of the signal to be received by the user device from the second cell, a hidden neighbor cell of the first cell by querying a table associated with the first cell, the table comprising a list of potential hidden neighbor cells of the first cell;

determining a strength of a signal to be received by the user device from the hidden neighbor cell;

classifying, based on the determined signal strength of the hidden neighbor cell, a cause of the confusion during cellular network handovers; and modifying, based on the classified cause of confusion, one or more parameters of the second cell or the hidden neighbor cell to prevent confusion during future cellular network handovers.

16. The system of claim 15, further comprising:

identifying the second cell as a confusion cell candidate by:

determining, based on the identified geographic location, a coverage area for each of the first and second cells;

determining one or more overlapping coverage areas between the first cell and the second cell based on the coverage areas of the first and second cells;

collecting a plurality of PCI confusion values for the first, and second cells comprising at least one of: a handover timestamp, an identification of the first cell, an identification of the second cell, an identifier of the user device, a geolocation of the user device, handover preparation statistics, or handover execution metrics; and identifying a pattern of repeated PCI confusion based on the plurality of PCI confusion values, wherein identifying the pattern of repeated PCI confusion comprises determining that a number of matches between the collected PCI confusion values for the first cell and the collected PCI confusion values for the second cell exceeds a threshold value.

17. The system of claim 15, wherein determining the strength of the signal to be received by the user device from the second cell or the hidden neighbor comprises:

determining cell information for the second cell or the hidden neighbor, the cell information comprising at least one of: a cell identifier, a PCI value, a frequency, a geolocation, a cell antenna azimuth, a cell down tilt, a cell horizontal beam width, a cell vertical beam width, a pilot power, a cell antenna gain, or a transmission loss; and calculating, by the one or more processors, the strength of the signal to be received by the user device from the second cell or the hidden neighbor according to the equation $$P(\text{dBm}) = \text{Power} + \text{Gain} - \text{Loss} - 1.2\left(\frac{\theta^2}{HBW^2}\right) - 1.2\left(\frac{\phi^2}{VBW^2}\right)$$

where Power, Gain, Loss, HBW, and VBW correspond to values associated with a configuration of the second cell or the hidden neighbor, wherein $$1.2\left(\frac{\theta^2}{HBW^2}\right)$$

is a horizontal angular loss of the determined signal and wherein $$1.2\left(\frac{\phi^2}{VBW^2}\right)$$

is a vertical angular loss of the determined signal.

18. One or more non-transitory computer-readable storage media storing instructions thereon that, when executed by one or more processors, cause the one or more processors to perform operations comprising:

identifying a geographic location of a handover failure of a user device from a first cell to a second cell;

determining a strength of a signal to be received by the user device from the second cell;

determining, based on the strength of the signal to be received by the user device from the second cell, a hidden neighbor cell of the first cell by querying a table associated with the first cell, the table comprising a list of potential hidden neighbor cells of the first cell;

determining a strength of a signal to be received by the user device from the hidden neighbor cell; classifying, based on the determined signal strength of the hidden neighbor cell, a cause of the confusion during cellular network handovers; and modifying, based on the classified cause of confusion, one or more parameters of the second cell to prevent confusion during future cellular network handovers.

19. The non-transitory computer-readable storage media of claim 18, wherein the instruction further cause the one or more processors to perform operations comprising:

identifying the second cell as a confusion cell candidate by:

determining, based on the identified geographic locations, a coverage area for each of the first and second cells;

determining one or more overlapping coverage areas between the first cell and the second cell based on the coverage areas of the first and second cells;

collecting a plurality of PCI confusion values for the first and second cells comprising at least one of: a handover timestamp, an identification of the first cell, an identification of the second cell, an identifier of the user device, a geolocation of the user device, handover preparation statistics, or handover execution metrics; and identifying a pattern of repeated PCI confusion based on the plurality of PCI confusion values, wherein identifying the pattern of repeated PCI confusion determining that a number of matches between the collected PCI confusion values for the second cell and the collected PCI confusion values for the second cell exceeds a threshold value.

20. The non-transitory computer-readable storage media of claim 18, wherein determining the strength of the signal to be received by the user device from the second cell or the hidden neighbor cell comprises:

determining cell information for the second cell or the hidden neighbor cell, the cell information comprising at least one of: a cell identifier, a PCI value, a frequency, a geolocation, a cell antenna azimuth, a cell down tilt, a cell horizontal beam width, a cell vertical beam width, a pilot power, a cell antenna gain, or a transmission loss; and calculating the strength of the signal to be received by the user device from the second cell or the hidden neighbor cell according to the equation $$P(\text{dBm}) = \text{Power} + \text{Gain} - \text{Loss} - 1.2\left(\frac{\theta^2}{HBW^2}\right) - 1.2\left(\frac{\phi^2}{VBW^2}\right)$$

where Power, Gain, Loss, HBW, and VBW correspond to values associated with a configuration of the second cell or the hidden neighbor cell, wherein $$1.2\left(\frac{\theta^2}{HBW^2}\right)$$

is a horizontal angular loss of the determined signal and wherein $$1.2\left(\frac{\phi^2}{VBW^2}\right)$$

is a vertical angular loss of the determined signal.

* * * * *